(12) United States Patent
Kodama et al.

(10) Patent No.: US 8,111,765 B2
(45) Date of Patent: Feb. 7, 2012

(54) COMMUNICATION APPARATUS, COMMUNICATION METHOD, AND INTEGRATED CIRCUIT

(75) Inventors: Nobutaka Kodama, Fukuoka (JP); Hisao Koga, Fukuoka (JP)

(73) Assignee: Panasonic Corporation, Osaka (JP)

( * ) Notice: Subject to any disclaimer, the term of this patent is extended or adjusted under 35 U.S.C. 154(b) by 63 days.

(21) Appl. No.: 12/482,990

(22) Filed: Jun. 11, 2009

(65) Prior Publication Data
US 2009/0310699 A1    Dec. 17, 2009

Related U.S. Application Data

(60) Provisional application No. 61/060,960, filed on Jun. 12, 2008.

(51) Int. Cl.
   *H04L 27/28*  (2006.01)
   *H04L 27/36*  (2006.01)
   *H04L 27/38*  (2006.01)

(52) U.S. Cl. .................. 375/260; 375/295; 375/316

(58) Field of Classification Search .............. 375/260, 375/295, 316, 354, 362–367; 370/203, 208, 370/210, 503, 509–515; 340/FOR. 405, 340/538
See application file for complete search history.

(56) References Cited

U.S. PATENT DOCUMENTS

| 2004/0057529 A1 | 3/2004 | Koga et al. |
| 2006/0227890 A1* | 10/2006 | Koga et al. .................. 375/260 |
| 2007/0248175 A1* | 10/2007 | Bruninghaus et al. ........ 375/260 |

FOREIGN PATENT DOCUMENTS

| EP | 1 061 687 | 12/2000 |
| JP | 2004-166217 | 6/2004 |

OTHER PUBLICATIONS

PCT International Search Report dated Jun. 17, 2010.

* cited by examiner

*Primary Examiner* — Tesfaldet Bocure
(74) *Attorney, Agent, or Firm* — Dickinson Wright PLLC

(57) ABSTRACT

A communication apparatus for transmitting transmission data containing a preamble and a postamble is provided. The communication apparatus includes: a phase vector assigning unit which assigns a first phase vector to a plurality of subcarriers relating to the preamble and assigns a second phase vector to a plurality of subcarriers relating to the postamble, the first phase vector being different from the second phase vector.

19 Claims, 26 Drawing Sheets

WHEN SYMBOL SYNCHRONIZATION IS ACHIEVED

WHEN SYMBOL SYNCHRONIZATION IS NOT ACHIEVED

FIG.17
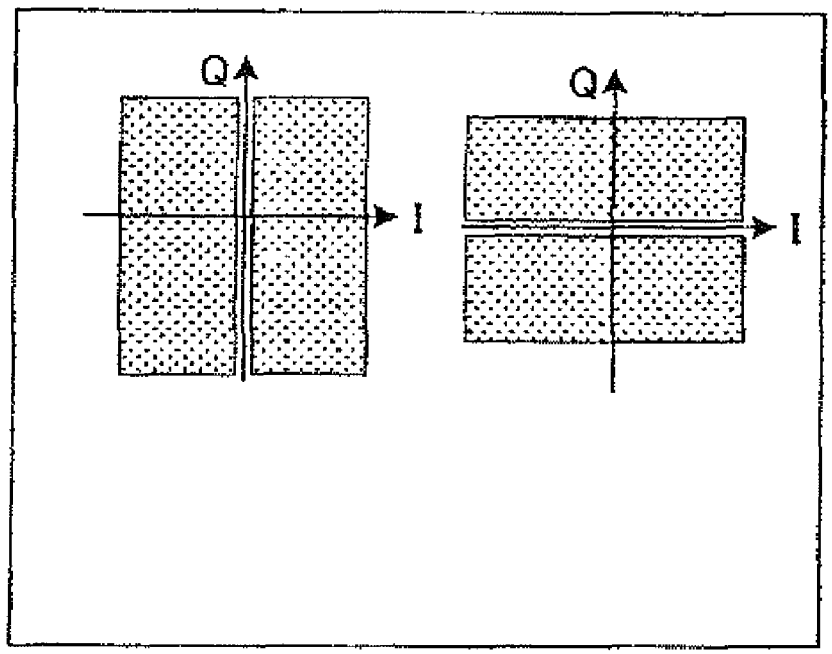
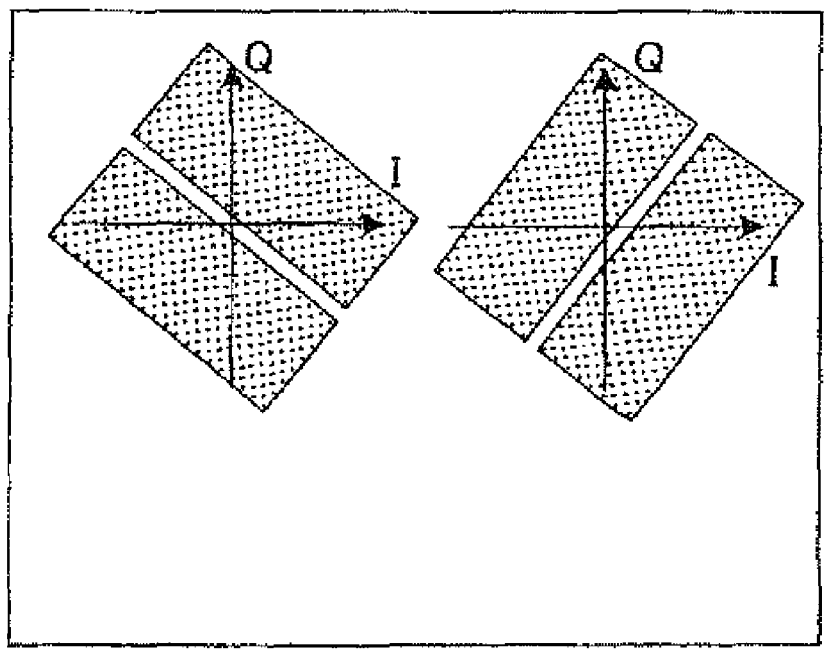

COMMUNICATION APPARATUS, COMMUNICATION METHOD, AND INTEGRATED CIRCUIT

This application is a non-provisional of provisional application No. 61/060,960 filed on Jun. 12, 2008, the subject matter of which is incorporated by reference herein.

BACKGROUND

1. Technical Field

The invention relates to a communication apparatus capable of conducting communications of a multicarrier communication system such as an OFDM (Orthogonal Frequency Division Multiplexing) system, for example.

2. Background Art

The multicarrier communication system for transmitting information using a plurality of subcarriers, such as the OFDM system has the large advantage that it enables high-quality communications even in a harsh channel, and can be used for communications using various communication media, such as wireless communications and power line communications (PLC). The OFDM system is a system for using orthogonal transformation such as FFT (Fast Fourier Transform) or DWT (Discrete Wavelet Transform), making a plurality of carriers orthogonal to each other on a frequency domain, placing them at equal spacings, and multiplexing signals in parallel for transmission. In the OFDM system, the frequency interval of multicarrier can be narrowed, a plurality of carriers can be densely arranged without interfering with each other while some carriers overlap each other, and it is made possible to realize broad-band transmission efficiently using a narrow frequency range.

FIG. 1 shows a packet format example of a general OFDM signal. A packet of an OFDM signal transmitted in OFDM communications has a preamble 101, frame control (FC) 102, and a payload 103 from the head.

The preamble 101 is a separation bit string (synchronization code word) added to the beginning of data to serially transmit digital data and is formed of known data. For example, as the preamble 101, a preamble provided by providing each subcarrier with a plurality of "+1" consecutively or the like is used. A receiving communication apparatus uses the preamble formed of known data to perform control processing of carrier detection, synchronization timing extraction, equalization coefficient extraction, etc., for detecting the packet. The frame control 102 contains control information of tone map index, packet length, source address, destination address, index, etc., required for transmission and reception. Usually, fixed and strong error correction system, modulation system, time frequency diversity, etc. are applied to the frame control 102. The tone map is collection of information of the number of bits of each subcarrier (modulation system), error correction system, etc., and is previously determined and set between the transmitting communication apparatus and the receiving communication apparatus. The payload 103 is a portion of the data main body to be transmitted and the tone map data and the packet length data in accordance with the control information are stored in the packet and are transmitted.

When the packet of the OFDM signal as described above is transmitted from the transmitting communication apparatus, if new information 104 comes from an upper layer of the network after the packet length is determined and is specified in the control information of the control frame 102, the packet length is already determined and thus the new information cannot be added to the payload 103. In this case, the new information 104 is postponed and is transmitted in the payload 103 of the next frame. Since the preamble 101 and the frame control 102 are redundant information, if a new packet is generated to transmit the new information 104, overhead increases and the transmission efficiency is reduced. In communications requiring a real-time property, postponing the new information 104 to the next frame may lead to a signal delay (see JP-A-2004-166217, for instance).

SUMMARY

An aspect of the invention provides a communication apparatus for transmitting transmission data containing a preamble and a postamble, the communication apparatus including: a phase vector assigning unit which assigns a first phase vector to a plurality of subcarriers relating to the preamble and assigns a second phase vector to a plurality of subcarriers relating to the postamble, the first phase vector being different from the second phase vector.

BRIEF DESCRIPTION OF THE DRAWINGS

In the accompanying drawings:

FIG. 17 shows the areas of the signal points on the complex plane counted in the correlation distribution calculator in FIG. 16;

DETAILED DESCRIPTION

Figure 1:
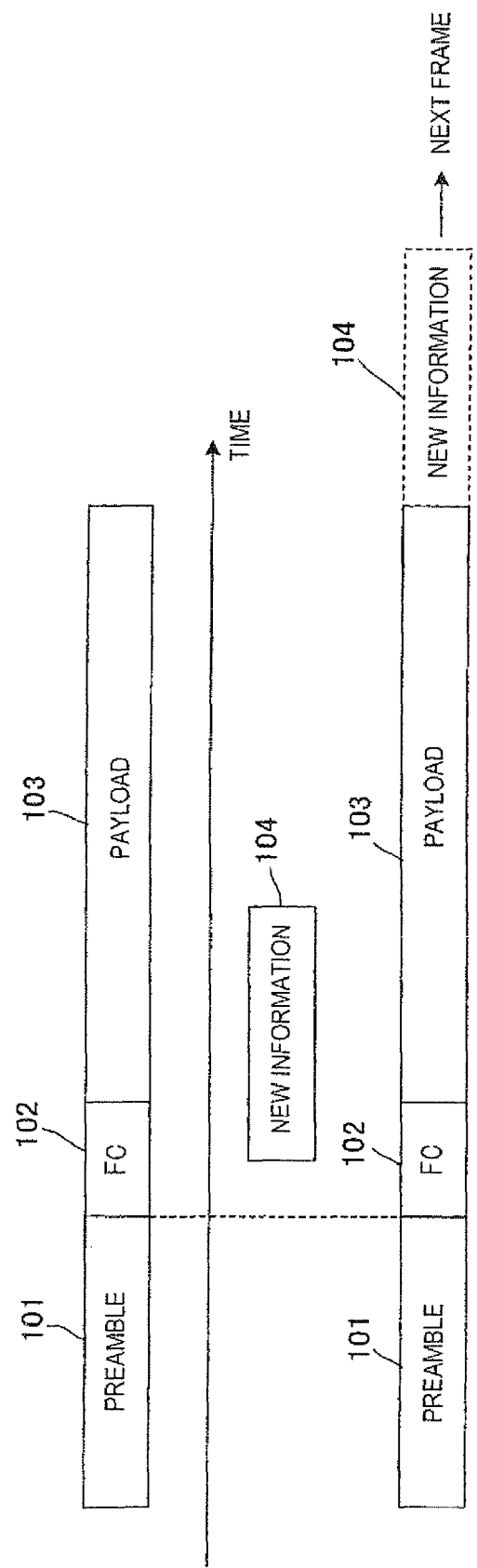
FIG. 1 shows a packet format example of a general OFDM signal.

For example, a method of using a postamble is possible as a method of making it possible to add new information to the current packet if new information comes from the upper layer of the network after the control information of the frame control is determined as in the example shown in FIG. 1. The postamble is a separation bit string added to the end of data to serially transmit digital data. The receiving communication apparatus can determine the end of the data by detecting the postamble. Therefore, packet length information is not contained in the frame control, the length of the payload is made variable, and the postamble may be provided following the payload. Accordingly, if a packet of any desired length is transmitted, it is made possible for the receiving communication apparatus to perform normal reception processing.

The case where data is transmitted on an N-to-N network is assumed. To determine the end of data according to a postamble to conduct communications, all terminals existing on the network need be able to determine the presence or absence of the postamble. If the postamble cannot be detected, the length of the current packet being transmitted is unknown, a packet is transmitted although another terminal is transmitting a packet, and a collision of the packets may occur. To avoid the collision of the packets, a method of waiting until the assumed maximum length of the packet before starting transmission of the packet or the like is adopted, whereby the use efficiency of the band of the channel is reduced.

In the OFDM system, if symbol synchronization is not achieved, a valid data string cannot be received. Thus, to determine the presence or absence of the postamble according to a data string, it is assumed that symbol synchronization is achieved. However, if a symbol (for) synchronizing symbol is transmitted to receive a postamble, a problem of a reduction in the transmission efficiency occurs. When the contents of a transmission signal addressed to another terminal cannot be interpreted, even if synchronization is achieved in a preamble, there is a possibility that synchronization may be lost midway through transmission and it is feared that a postamble cannot be detected.

It is an object of the invention to provide a communication apparatus realizing a postamble requiring no symbol synchronization. It is another object of the invention to provide a communication apparatus that can reliably determine the presence or absence of the postamble if synchronization is not achieved and makes it possible to transmit a packet of any desirable length on a network where a plurality of terminals exist.

A communication apparatus according to embodiments can conduct communications of a multicarrier communication system such as an OFDM system and is used on a network where a plurality of terminals exist and communicate with each other. In the description to follow, a communication apparatus of the OFDM system is illustrated. Various communication media such as wire lines of a power line, a network line, a TV antenna line, a telephone line, etc., and wireless links of a wireless LAN, UWB (Ultra Wide Band), WiMAX (Worldwide Interoperability for Microwave Access), etc., can be used as channels of communication signals in the network.

In the embodiment, a phase vector assigned to a communication signal is used and information is carried on a non-modulation signal in a postamble for making it possible to determine the presence or absence of the postamble. It is assumed that a postamble transmitted from a transmitting communication apparatus has two or more same consecutive data pieces as a bit string forming the postamble. It is assumed that same consecutive data pieces of all "1," all "0," etc., for example, form a postamble and a non-modulation signal is transmitted as the postamble. At this time, different phase vectors are set in the preamble and the postamble, respectively. Accordingly, the receiving communication apparatus can determine the presence or absence of the postamble by determining the phase vector.

Figure 2:
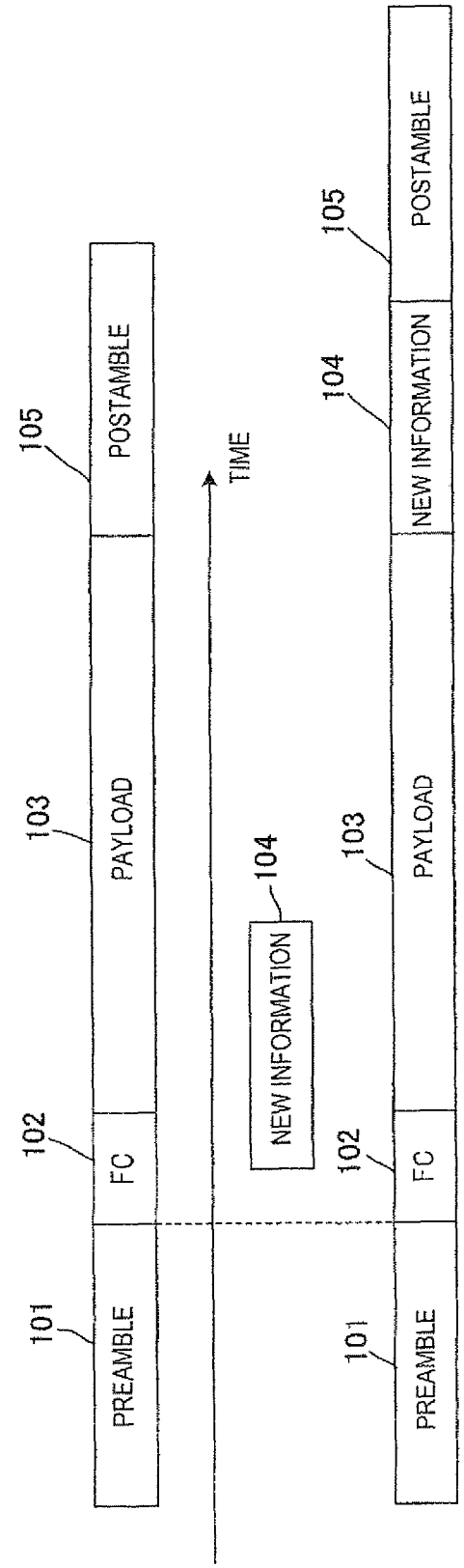
FIG. 2 shows a packet format example of an OFDM signal according to embodiments of the invention.

FIG. 2 shows a packet format example of an OFDM signal according to the embodiment of the invention. A packet of an OFDM signal transmitted in the communication apparatus of the embodiment has a postamble 105 indicating the end of data as well as a preamble 101, frame control (FC) 102, and a payload 103.

The preamble 101 includes ten symbols. To some of the ten symbols, correction information for correcting phase distortion which the packet of the OFDM signal is affected by the noise on the transmission channel and synchronization information for synchronizing the reception apparatus 20 with the transmission apparatus 10 are assigned.

One symbol includes 423 subcarriers, for example.

In this case, packet length information is not contained in the frame control 102, the data length of the payload 103 is made changeable, and the postamble 105 is provided at the end of the data to indicate the end of the packet. When the packet is transmitted from the transmitting communication apparatus, if new information 104 comes from an upper layer of the network after the control information of the control frame 102 is set, the new information 104 is added following the already generated payload 103 and then the postamble 105 is added. The receiving communication apparatus (destination or another terminal) detects a signal having a specific phase vector, thereby determining the postamble 105 and recognizing the end of the transmitted packet.

Specifically, the postamble 105 is almost the same signal type as the preamble 101 (differs from the preamble 101 in used phase vector) and includes six symbols. The postamble 105 is provided at the end of OFDM packet (also called frame).

Moreover, a symbol length of the postamble 105 is made shorter than a symbol length of the preamble 101. When the symbol length of the postamble 105 is made shorter than the symbol length of the preamble 101, the transmission efficiency of the OFDM packet will be enhanced.

Figure 3:
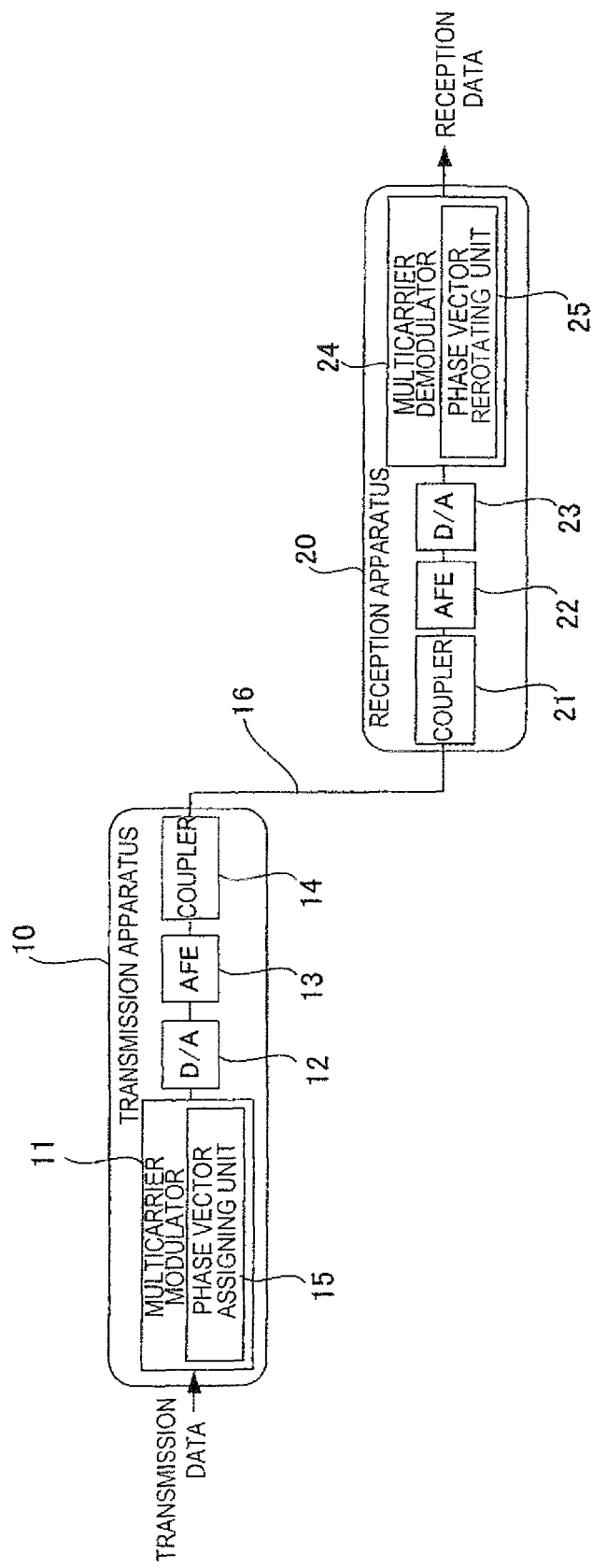
FIG. 3 is a block diagram to show the configuration of the main part of a communication apparatus according to the embodiments of the invention.

FIG. 3 is a block diagram to show the configuration of the main part of the communication apparatus according to the embodiment of the invention. FIG. 3 shows a transmission apparatus 10 of a transmitting party and a reception apparatus 20 of a receiving party separately, but generally a communication apparatus has the functions of both the transmission apparatus 10 and the reception apparatus 20. In the configuration example in FIG. 3, the configuration wherein a power line communication apparatus (PLC modem) is assumed as the communication apparatus is shown.

The transmission apparatus 10 includes a multicarrier modulator 11, a D/A converter 12, an analog front end (AFE) 13, and a coupler 14. The multicarrier modulator 11 modulates transmission data of a multicarrier signal of the OFDM system using orthogonal transformation such as inverse Fourier transform (IFFT) or inverse wavelet transform (IDWT). The D/A converter 12 converts a provided digital signal of the multicarrier into an analog signal and outputs the analog signal. The analog front end 13 allows a necessary frequency band signal to pass through from the input analog signal. The coupler 14 superposes the input analog signal on a channel 16 for transmission. The multicarrier modulator 11 includes a phase vector assigning unit 15 for using a phase vector with a phase randomized according to a specific bit series as for transmission data corresponding to each subcarrier of a multicarrier signal, rotating the phase of the signal in each subcarrier, and assigning a phase vector. The multicarrier signal transmitted from the transmission apparatus 10 is transmitted to the reception apparatus 20 via the channel 16.

The reception apparatus 20 includes a coupler 21, an analog front end 22, an A/D converter 23, and a multicarrier demodulator 24. The coupler 21 separates a predetermined analog signal from the received multicarrier signal. The analog front end 22 allows a necessary frequency band signal to pass through from the separated analog signal. The A/D converter 23 converts the input analog signal into a digital signal and outputs the digital signal. The multicarrier demodulator 24 demodulates reception data of a multicarrier signal of the OFDM system using Fourier transform (FFT) or wavelet transform (DWT). The multicarrier demodulator 24 includes a phase vector rerotating unit 25 for using a phase vector with a phase randomized according to a specific bit series as for reception data corresponding to each subcarrier of the demodulated multicarrier signal, inversely rotating the phase of the signal in each subcarrier, and rerotating the phase vector.

The phase vector is a set of values indicating the phases corresponding to the signals of the subcarriers of a multicarrier signal and is set so that the phases of the signals in all subcarriers become random. Here, the "phase vector" is a set of values indicating the rotation amounts of the signal points of the subcarriers making up a multicarrier signal of an OFDM signal, etc., on a complex coordinate plane and refers to a combination of values for leveling the time waveform of the multicarrier signal (suppressing the peak on the time domain). The phase vector is a fixed value of a combination of predetermined values or a variable value of a combination of values changed in response to a predetermined condition. The predetermined condition is cyclic shift described later or a random value. The phase vector is called "carrier phase" as another name. In this case, the fixed value is called "determined stick carrier phase" and the variable value is called "random carrier phase."

The embodiment shows an example in which one phase is assigned to each of the subcarriers. Alternatively, however, one phase may be assigned to a plurality of the subcarriers. When one phase is assigned to the plurality of the subcarriers, the one phase is preferably assigned to adjacent subcarriers, or consecutive subcarriers.

Further, the phase vector assigning unit 15 may assign a phase vector to the transmission data without particular bit series. For example, it is possible to assign the phase vector to the transmission data just if at least one of the subcarriers is rotated among the subcarriers of the transmission data.

The more the number of subcarriers to be rotated is increased, the less correlation appears between the preamble 101 and the postamble 105. Thus, it becomes easy to determine the difference between the preamble 101 and the postamble 105, thereby making the accuracy for carrier detection be higher.

Figure 4:
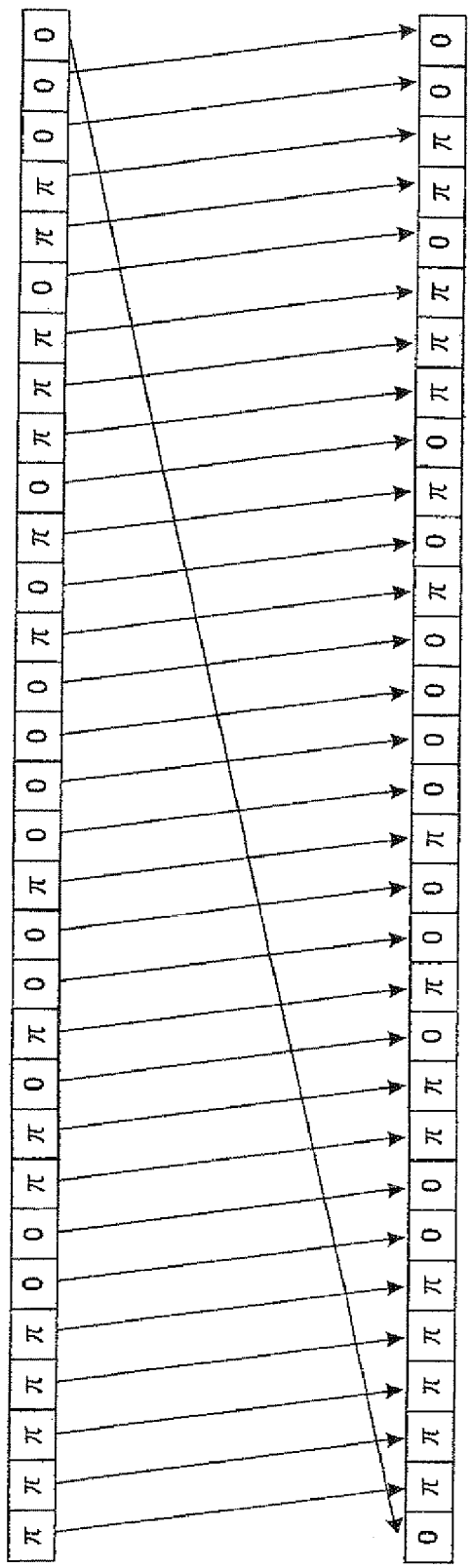
FIG. 4 shows an example of a bit series used in the embodiments of the invention.

FIG. 4 shows an example of a bit series used in the embodiments of the invention. The bit series shown in FIG. 4 is an example of cyclic shift type and is based on a bit series having a value of "0" or "π." Such a bit series of cyclic shift type can be generated based on PN (Pseudo Noise) code, etc. The PN code, etc., is used, whereby while the phase of the signal of each subcarrier is randomized, a characteristic having high autocorrelation and low cross correlation can be provided. As shown in FIG. 4, one bit series having a value of "0" or "π" is cyclically shifted, whereby different phase vectors such as phase vector A (first phase vector) and phase vector B (second phase vector) can be generated. Therefore, a phase vector of cyclic shift type is used, whereby it is made possible to easily generate different phase vectors and change a phase vector. In this case, one bit series needs only to be stored, so that the memory capacity for holding information of the phase vector can be reduced.

The embodiment shows an example in which one phase is assigned to each of the subcarriers. Here, the detailed description of the bit series shown in FIG. 4 is made.

The preamble includes ten symbols, and each of the symbols includes 432 subcarriers. The initial value of the phase of each subcarrier is set to zero.

The values "0", "π" indicate a rotation amount with respect to the phase of the subcarrier. The "0" means that the phase of the subcarrier is not varied. The "π" means that the phase of the subcarrier is varied 180°. The bit series has the same number of values indicating the rotation amount as the subcarriers included in each subcarrier.

The phase is set to the subcarrier of the preamble 101 using a bit series as shown on the upper side of FIG. 4. When the phase is set with the bit series as shown on the upper side of FIG. 4, the phases of the first to fifth subcarriers are set to 180°, and the phases of the sixth and seventh are not varied.

Such settings are made up to the 432nd subcarrier, and thus, the phase vector A with respect to the subcarrier of the preamble 101 is set.

By contrast, the phase is set to the subcarrier of the postamble 105 using a bit series as shown on the lower side of FIG. 4. When the phase is set with the bit series as shown on the lower side of FIG. 4, the phase of first subcarrier is varied, and the phases of the second to sixth are set to 180°. Such settings are made up to the 432nd subcarrier, and thus, the phase vector B with respect to the subcarrier of the postamble 105 is set.

The phase setting to each subcarrier can be made by taking in sequence the first to the 432nd subcarriers, and alternatively, by taking en bloc the first to the 432nd subcarriers. In the embodiments, the transmission apparatus 10 sets and transmits specific phase vectors different between the preamble and the postamble of a packet of transmission data and the reception apparatus 20 rerotates the phase vectors of the reception data and detects signals having the specific phase vectors corresponding to the preamble and the postamble. The signals of the specific phase vectors are thus detected, whereby the postamble can be detected. At this time, the transmission apparatus 10 and the reception apparatus 20 share information of the phase vectors. Information is carried on the phase of a non-modulation signal according to the phase vector, whereby the reception apparatus 20 need not achieve symbol synchronization and a postamble requiring no symbol synchronization can be realized. If synchronization is not achieved in the reception apparatus 20, the presence or absence of the postamble can be determined reliably and the termination of the packet can be recognized. Thus, if a packet of any desirable length is transmitted on a network where a plurality of terminals exist, a packet collision and the use band loss of the channel can be suppressed. In this case, data can be arbitrarily added into the same packet if a postamble is not yet transmitted at the data transmission time, so that addition of redundant data accompanying packet division can be reduced and the transmission efficiency can be enhanced.

First Embodiment

Figure 5:
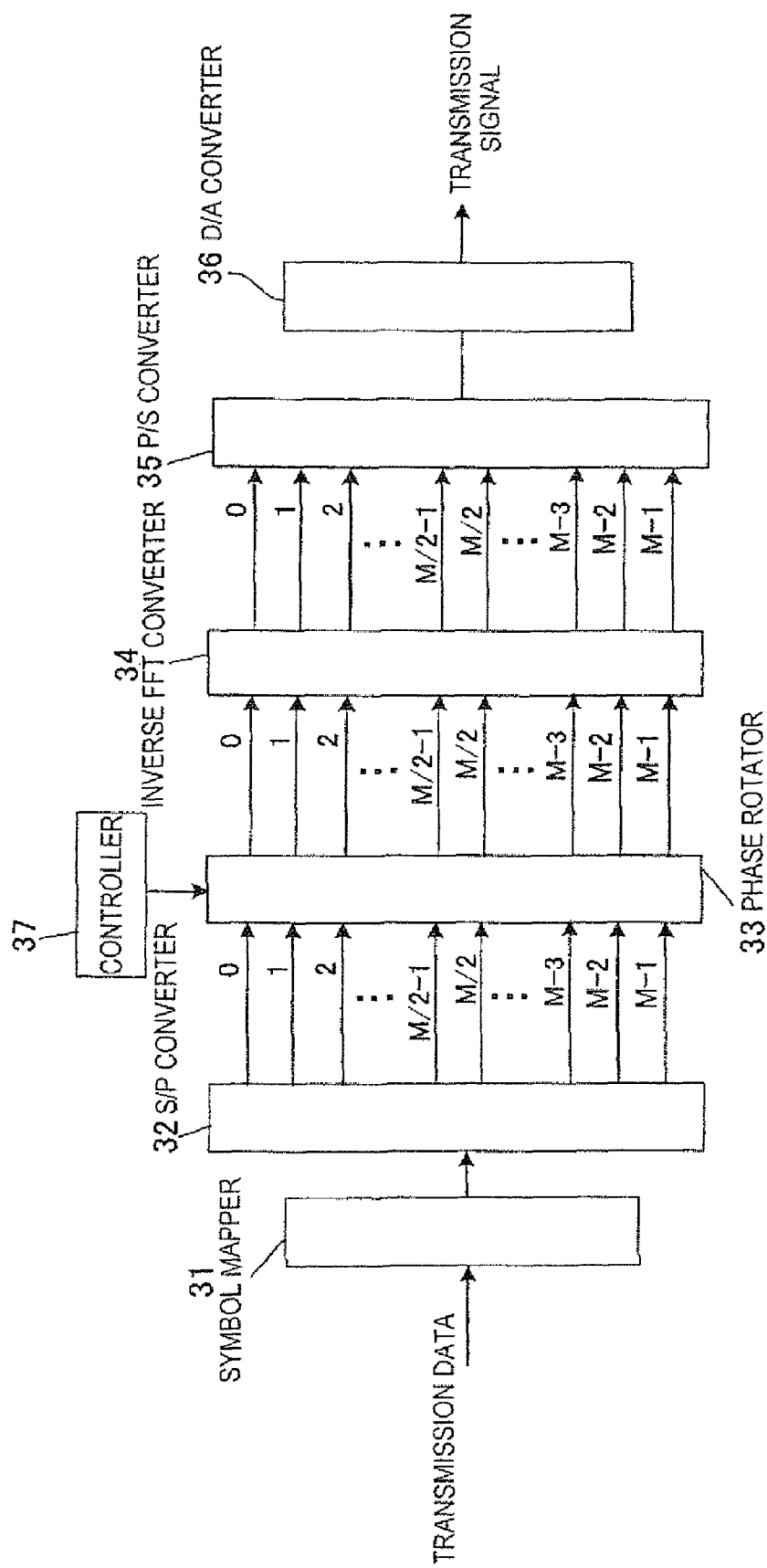
FIG. 5 is a block diagram to show the configuration of a transmitting apparatus according to a first embodiment of the invention.

FIG. 5 is a block diagram to show the configuration of a transmitting apparatus according to a first embodiment of the invention. FIG. 5 shows a configuration example of the main part of a communication apparatus which becomes the transmitting apparatus in the first embodiment. In the configuration example, inverse Fourier transform (IFFT) is used for modulation of a multicarrier signal. The transmitting apparatus includes a symbol mapper 31, a serial/parallel converter (S/P converter) 32, a phase rotator 33, an inverse FFT converter 34, a parallel/serial converter (P/S converter) 35, a D/A converter 36, and a controller 37.

The symbol mapper 31 maps transmission data of serial data into a complex coordinate plane. The symbol mapper 31 converts transmission data of bit data into symbol data to perform primary modulation and maps the data into M−1 (where M is the number of subcarriers) complex coordinate planes. The S/P converter 32 converts serial data into parallel data corresponding to each subcarrier of a multicarrier signal. The S/P converter 32 converts serial data after primary modulation input serially (transmission symbol) into parallel data corresponding to each subcarrier of a multicarrier signal. The order of the symbol mapper 31 and the S/P converter 32 can also be changed.

The phase rotator 33 rotates the phase of the parallel data corresponding to each subcarrier. The phase rotator 33 rotates the phase of the input parallel data in accordance with a control signal from the controller 37. That is, a phase rotation angle of "0" or "π," for example, is given for each subcarrier and the phase is rotated. Here, the maximum number of the parallel data pieces whose phase is rotated is M−1. The inverse FFT converter 34 performs IFFT of the parallel data whose phase has been rotated and converts the data into a time domain. The inverse FFT converter 34 performs inverse Fourier transform of the parallel data of each subcarrier whose phase has been rotated, performs multicarrier modulation, and generates a transmission signal of a multicarrier. The P/S converter 35 converts the parallel data subjected to the multicarrier modulation into serial data. The D/A converter 36 converts the multicarrier signal of the serial data into an analog signal and outputs the analog signal.

The controller 37 controls the whole operation of the transmitting apparatus and also controls transmission data. It supplies a control signal to the phase rotator 33 and controls setting and change of a phase vector. Specifically, the controller 37 controls the phase rotation operation of the phase rotator 33 based on the sending timings of a preamble and a postamble of transmission data and assigns a specific phase vector to the transmission data. The controller 37 has a bit series holding unit and a cyclic shift unit, uses a specific bit series of pseudo random values having two values of "0" and "π" based on a PN series, for example, generates a bit series based on a specific cyclic shift amount, supplies the bit series to the phase rotator 33 as a control signal of a phase vector, and rotates the phase for each target subcarrier. Accordingly, a predetermined phase vector is set.

At this time, the controller 37 sets different phase vectors in the preamble and the postamble, respectively and switches the phase vector of the phase rotator 33 in synchronization with the timing of each of the preamble sending time and the postamble sending time. The controller 37 transmits the same data in consecutive symbols as transmission data in each of the preamble and the postamble. Therefore, in this case, in the preamble and the postamble, the waveform of the multicarrier transmission signal becomes a sine wave group. The phase vector of the data part containing the frame control and the payload between the preamble and the postamble can take any of various modes in such a manner that it is made the same as the postamble, that it is made the same as the preamble, that it is set to any other phase vector, or that phase rotation is not given.

Here, an example of determination process is shown in which the transmission apparatus 10 switches, when transmitting a transmission packet of OFDM, the phase vector from the phase vector A to the phase vector B.

Figure 6:
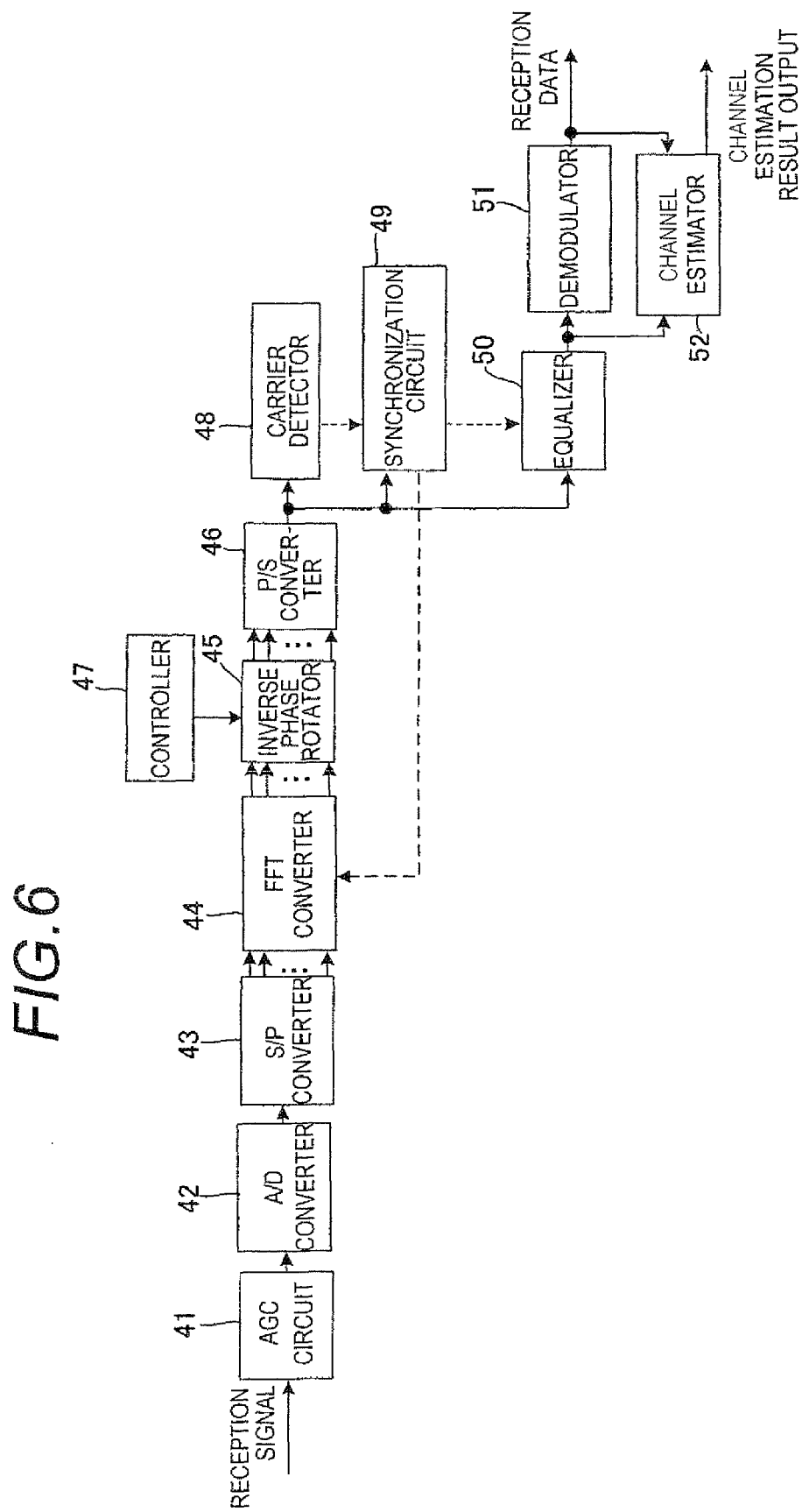
FIG. 6 is a block diagram to show the configuration of a receiving apparatus according to the first embodiment of the invention.
Figure 7:
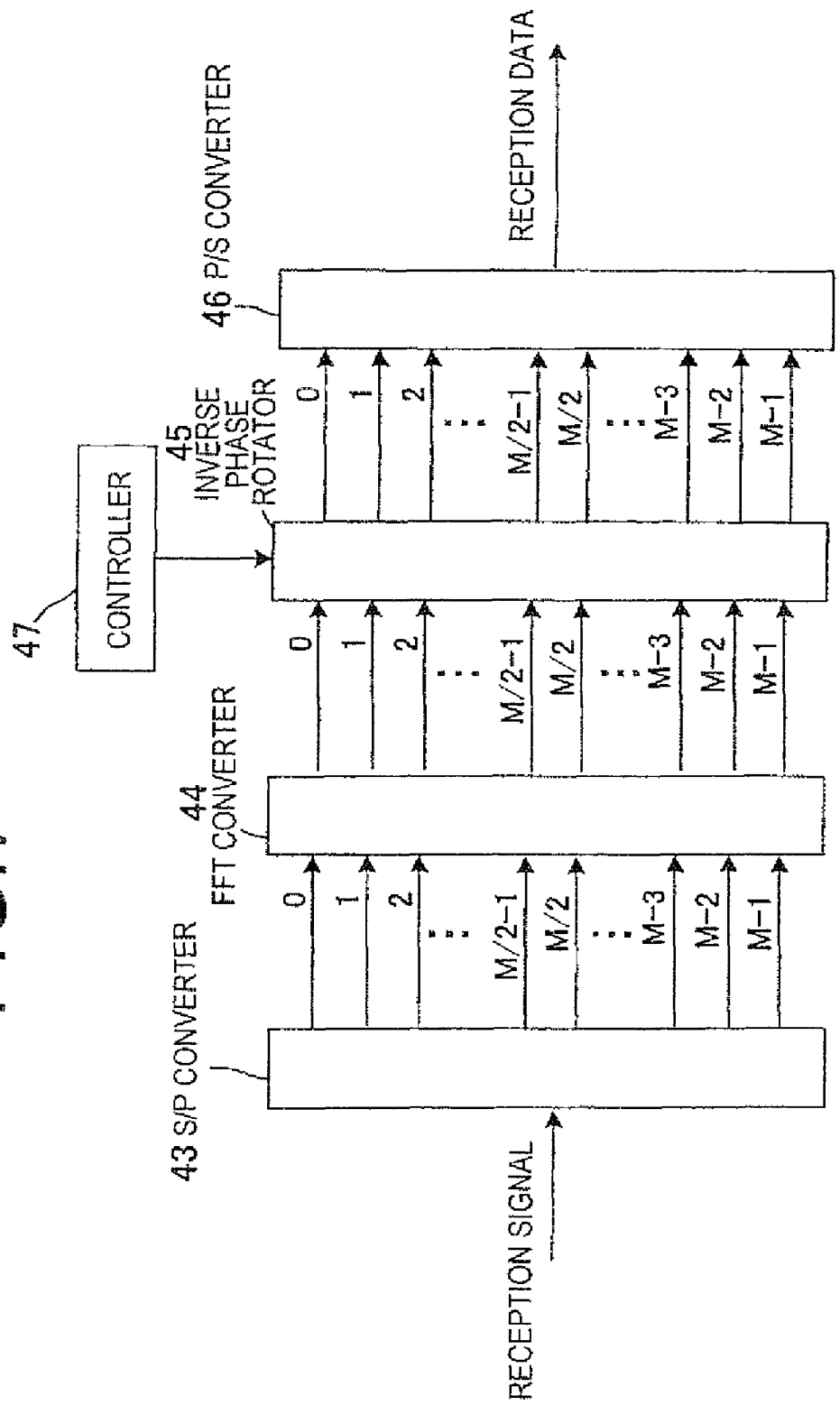
FIG. 7 is a block diagram to show the configuration of the portion concerning a phase vector of the receiving apparatus according to the first embodiment of the invention.

The controller 37 of the transmission apparatus 10 knows the number of symbols included in the transmission packet. Since the number of symbols of the postamble 105 is six, the controller 37 switches the phase vector of the phase vector assigning unit 15 from the phase vector A to the phase vector B at a timing when the number of the remaining symbols of the transmission packet becomes six. Thus, the different phase vectors can be set to the preamble 101 and the postamble 105, respectively. FIG. 6 is a block diagram to show the configuration of a receiving apparatus according to the first embodiment of the invention. FIG. 7 is a block diagram to show the configuration of the portion concerning a phase vector of the receiving apparatus according to the first embodiment of the invention. FIGS. 6 and 7 show a configuration example of the main part of the communication apparatus which becomes the receiving apparatus in the first embodiment. In the configuration example, Fourier transform (FFT) is used for demodulation of a multicarrier signal. The receiving apparatus includes an AGC circuit 41, an A/D converter 42, an S/P converter 43, an FFT converter 44, an inverse phase rotator 45, a P/S converter 46, a controller 47, a carrier detector 48, a synchronization circuit 49, an equalizer 50, a demodulator 51, and a channel quality estimator 52.

The AGC circuit 41 performs signal amplification while performing AGC (Auto Gain Control) of a reception signal. The A/D converter 42 converts the reception signal (analog signal) into a digital signal and outputs the digital signal. The S/P converter 43 converts serial data into parallel data corresponding to each subcarrier of a multicarrier signal. The S/P converter 43 converts serial data of reception data input serially (reception symbol) into parallel data corresponding to each subcarrier of a multicarrier signal. The FFT converter 44 performs FFT of the parallel data and converts the data into a frequency domain. The FFT converter 44 performs Fourier transform of the parallel data of each subcarrier, performs multicarrier demodulation, and generates reception data of parallel data corresponding to each subcarrier of the multicarrier signal.

The inverse phase rotator 45 rotates the phase of the parallel data corresponding to each subcarrier. The inverse phase rotator 45 rotates the phase of the input parallel data in accordance with a control signal from the controller 47 and restores the phase of each data piece to the former. Here, the maximum number of the parallel data pieces whose phase is rotated is M−1. The P/S converter 46 converts the parallel data whose phase has been restored (rerotated) corresponding to each subcarrier of the multicarrier signal into serial data. Changing the order of the inverse phase rotator 45 and the P/S converter 46 does not interfere with the operation.

The controller 47 controls the whole operation of the receiving apparatus. It supplies a control signal to the inverse phase rotator 45 and controls setting and change of a phase vector to be rerotated. Specifically, the controller 47 controls the phase rotation operation of the inverse phase rotator 45 and restores the phase rotation of the data of each subcarrier to the former according to a specific phase vector. The controller 47 has a bit series holding unit and a cyclic shift unit, uses a specific bit series of pseudo random values having two values of "0" and "π" based on a PN series, for example, generates a bit series based on a specific cyclic shift amount, supplies the bit series to the inverse phase rotator 45 as a control signal of a phase vector, and rotates the phase for each target subcarrier. In this case, the control signal of the phase vector becomes an inverse code to that of the transmitting apparatus. Accordingly, the phase of the data of each subcarrier is restored (rerotated) according to a predetermined setup phase vector.

At this time, the controller 47 sets different phase vectors in the preamble and the postamble, respectively, and switches the phase vector of the inverse phase rotator 45 in response to the preceding preamble or postamble detection result. Accordingly, the phase vector corresponding to the preamble or the phase vector corresponding to the postamble is set and the phase is inversely rotated. The phase vector of the data part between the preamble and the postamble may be set conforming to various modes of the phase vector of the transmission signal in such a manner that it is made the same as the postamble, that it is made the same as the preamble, that it is set to any other phase vector, or that phase rotation is not given.

Here, an example of determination process is shown in which the reception apparatus 20 switches, when receiving a reception packet of OFDM, the phase vector from the phase vector A to the phase vector B.

The controller 47 of the reception apparatus 20 knows the number of symbols included in the reception packet. Since the number of symbols of the postamble 105 is six, the controller 47 switches the phase vector of the phase vector rerotating unit 25 from the phase vector A to the phase vector B at a timing when the number of the remaining symbols of the reception packet becomes six. Thus, the different phase vectors can be set to the preamble 101 and the postamble 105, respectively, thereby rerotating the reception packet.

Alternatively, the controller 47 may switch the phase vector from the phase vector A to the phase vector B at a timing when the rerotating process to the preamble 101 is finished.

Further, the controller 47 may perform the rerotating process to the reception packet using both the phase vector A and the phase vector B at the same time. The carrier detector 48 inputs the reception data of serial data, performs carrier detection about the signal after the phase vector is rerotated according to a specific phase vector, and determines the preamble or the postamble by determining the presence or absence of a carrier. If the carrier detector 48 detects a carrier, it outputs a carrier detection signal to the synchronization circuit 49. The carrier detector 48 is described later in detail.

The synchronization circuit 49 inputs the reception data of serial data, generates a synchronization signal to synchronize the reception data, and outputs the synchronization signal to the FFT converter 44 and the equalizer 50. The equalizer 50 makes a comparison between complex information of the input reception data and known data, finds an equalization coefficient, and equalizes the complex information. The demodulator 51 demaps the reception data after equalized from the complex coordinate plane. The demodulator 51 converts symbol data on the complex coordinate plane into bit data and acquires reception data. The channel quality estimator 52 inputs output of the equalizer 50 and output of the demodulator 51 and measures the reception quality of a pilot signal contained in the reception data, thereby estimating the channel characteristic in each subcarrier of the multicarrier signal as transmission line estimation (channel estimation). The channel quality estimation result of the channel quality estimator 52 is fed back into the transmitting apparatus. The transmitting apparatus uses the channel quality estimation result to determine an appropriate modulation system, etc., for each subcarrier.

The receiving apparatus does not know which phase vector the arrival signal transmitted from the transmitting apparatus holds, and thus performs reception processing using an assumed phase vector. In this case, the carrier detector 48 performs carrier detection while the controller 47 switches the phase vector of the inverse phase rotator 45 conforming to the part of the frame of the packet.

Figure 8:
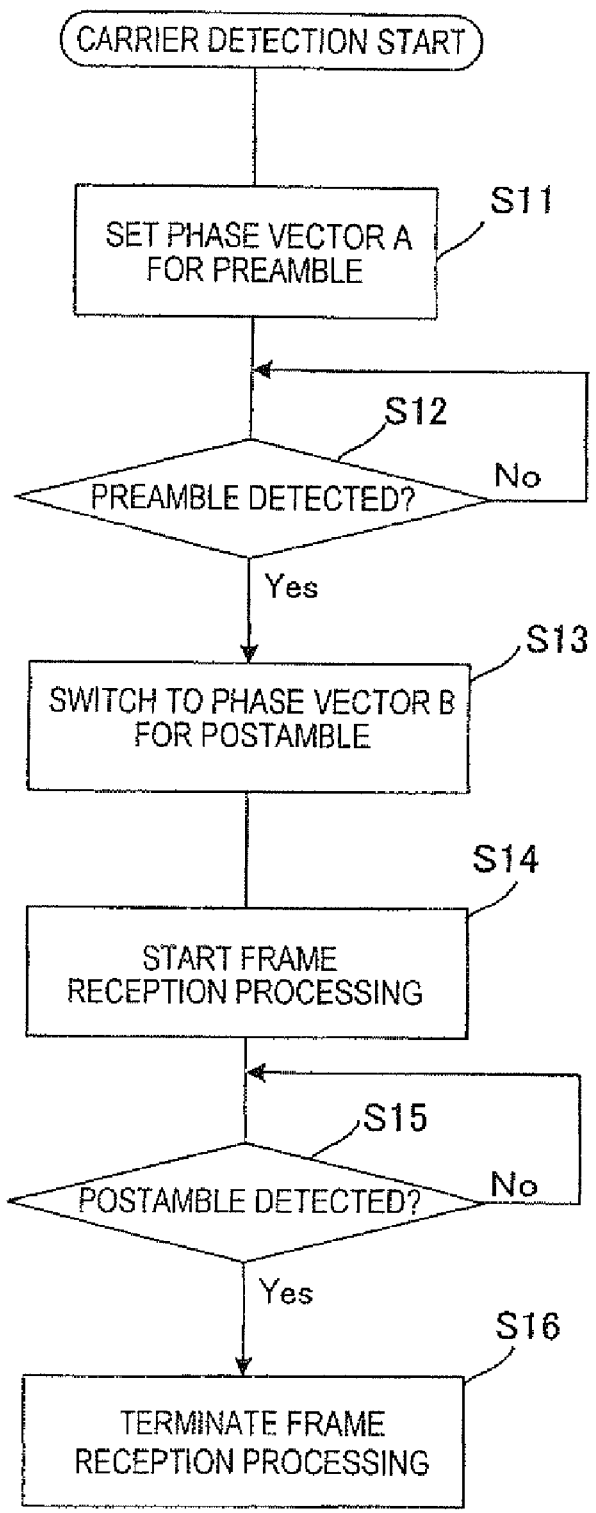
FIG. 8 is a flowchart to show the operation of carrier detection and reception processing in the receiving apparatus of the first embodiment of the invention.

FIG. 8 is a flowchart to show the operation of carrier detection and reception processing in the receiving apparatus of the first embodiment of the invention. First, the controller 47 sets phase vector A for a preamble (first phase vector) and gives the phase vector for a preamble by the inverse phase rotator 45, thereby searching for a preamble (step S11). The controller 47 determines whether or not the carrier detector 48 can detect a carrier and detects a preamble (step S12).

If a preamble is detected, the controller 47 switches the setting to phase vector B for a postamble (second phase vector) and gives the phase vector for a postamble by the inverse phase rotator 45 (step S13). Here, it is assumed that the phase vector of the data part between the preamble and the postamble is made the same as the postamble. The controller 47 starts frame reception processing, performs synchronization processing by the synchronization circuit 49 and equalization coefficient estimation by the equalizer 50, performs demodulation processing of frame control and a payload in the demodulator 51, and acquires reception data (step S14). Steps S13 and S14 can also be replaced with each other.

Then, while demodulation processing is performed in the demodulator 51, a search is made for a postamble according to the phase vector for a postamble. At this time, the controller 47 determines whether or not the carrier detector 48 can detect a carrier and detects a postamble (step S15). If a postamble is detected, the controller 47 assumes that the end of the data part is determined, and performs frame reception termination processing (step S16).

Thus, in the receiving apparatus, a specific phase vector is set and carrier detection of the signal corresponding to the phase vector is performed, whereby a preamble is detected in the phase vector A for a preamble, and a postamble is detected in the phase vector B for a postamble. In the first embodiment, the phase vector A for a preamble and the phase vector B for a postamble are switched in response to the signal detection timing, whereby the preamble and the postamble can be determined in time series.

Figure 9:
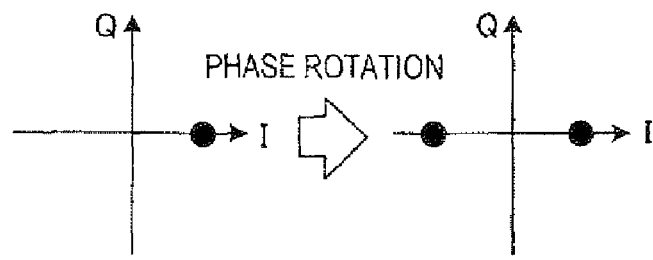
FIG. 9 shows an example of signal points of transmission data on a complex plane.
Figure 10:
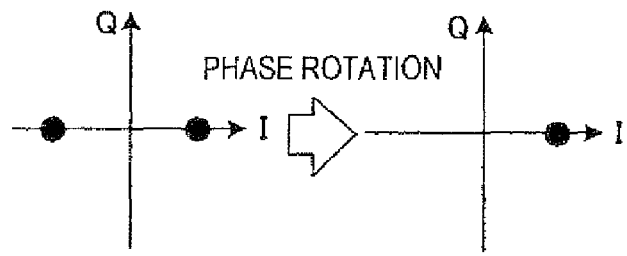
FIG. 10 shows an example of signal points of reception data on the complex plane when symbol synchronization is achieved.
Figure 11:
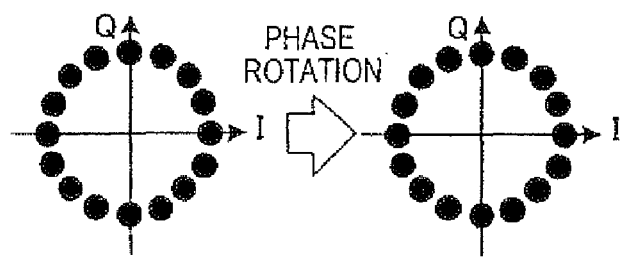
FIG. 11 shows an example of signal points of reception data on the complex plane when symbol synchronization is not achieved.

Next, the operation concerning detection of a preamble and a postamble using a phase vector will be discussed. First, examples of signal points of transmission data and reception data on a complex plane are shown. FIG. 9 shows an example of signal points of transmission data on the complex plane. FIGS. 10 and 11 show an example of signal points of reception data on the complex plane; FIG. 10 shows the case where symbol synchronization is achieved and FIG. 11 shows the case where symbol synchronization is not achieved. Here, the case where the bit string of a phase vector is made up of "0" and "π" will be discussed. Detection of a postamble will be discussed below; a preamble is also detected in a similar manner.

It is assumed that the transmitting apparatus transmits transmission data of all "1," for example, as a postamble. In this case, the symbol mapper 31 outputs consecutive symbols corresponding to "1" and the signal points concentrate on one point on the I axis of the complex plane as at the left of FIG. 9. The phase is 0- or π-rotated by the phase rotator 33 and a phase vector is assigned. In this case, the phase rotator 33 outputs symbols corresponding to "1" or "−1" and the signal points concentrate on two points with the origin between on the I axis of the complex plane as at the right of FIG. 9.

In the receiving apparatus receiving the transmission data mentioned above, output of the FFT converter 44 becomes as at the left of FIG. 10 or 11. If the phase is inversely 0- or π-rotated by the inverse phase rotator 45 and the phase vector is rerotated, the output becomes as at the right of FIG. 10 or 11. That is, when symbol synchronization is achieved, output of the FFT converter 44 becomes output such that the signal points concentrate on two points with the origin between on the I axis of the complex plane as at the right of FIG. 10. Output of the inverse phase rotator 45 becomes output such that the signal points concentrate on one point on the I axis of the complex plane by rerotating the phase vector and a symbol corresponding to "1" is restored. On the other hand, when symbol synchronization is not achieved, output of the FFT converter 44 becomes output such that the signal points do not concentrate on one point on the complex plane, the phase rotates at random, and the signal points position on the circumference with the origin as the center as at the left of FIG. 11. Output of the inverse phase rotator 45 becomes output such that if the phase vector is rerotated, the signal points position on the circumference with the origin as the center on the complex plane and the phase rotates at random.

Figure 12:
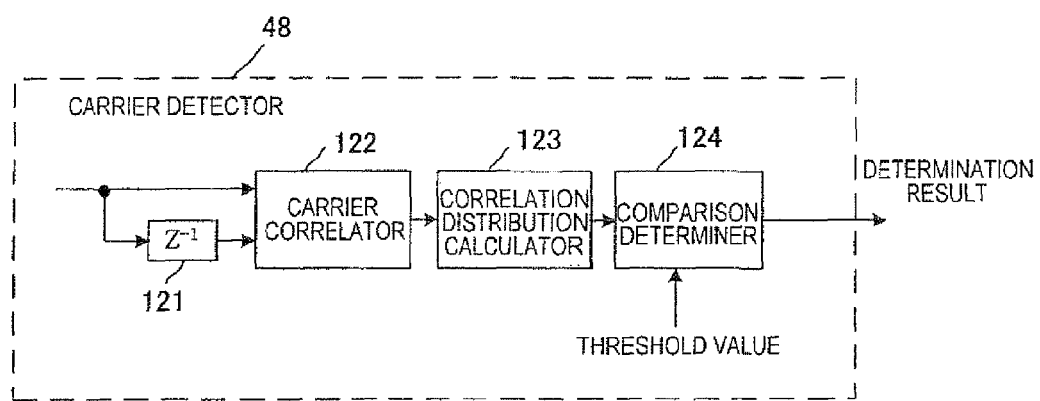
FIG. 12 is a block diagram to show a configuration example of a carrier detector of the first embodiment of the invention.
Figure 13:
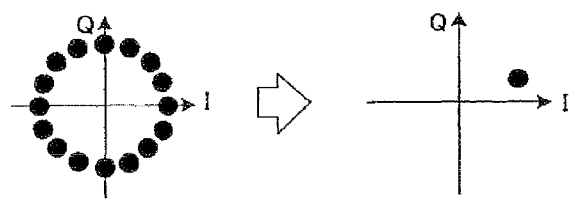
FIG. 13 shows an example of signal points on the complex plane in the carrier detector of the first embodiment of the invention.

The configuration and the operation of the carrier detector 48 used in the embodiment will be discussed. FIG. 12 is a block diagram to show a configuration example of the carrier detector of the embodiment of the invention, and FIG. 13 shows an example of signal points on the complex plane in the carrier detector of the embodiment of the invention. The carrier detector 48 includes a delay unit 121, a carrier correlator 122, a correlation distribution calculator 123, and a comparison determiner 124. The carrier correlator 122 makes a comparison between input data and data delayed by the delay unit 121 and finds a correlation between carriers. For example, the carrier correlator 122 calculates carrier correlation value C (n, k) according to the following expression (1):

$$C(n, k) = d(n, k-1) \times d(n, k)^* \quad (1)$$

where C: Carrier correlation value
   d: Complex value after FFT
   n: OFDM symbol number
   k: OFDM carrier number
   *: Complex conjugate To transmit the same consecutive data like postamble by a multicarrier signal of OFDM, the waveform of the transmission signal becomes a sine wave group in which each subcarrier is a sine wave. In this case, the phase difference between two adjacent subcarriers is constant in all subcarriers. Therefore, if a correlation between carriers is found, a constant value is obtained in all subcarriers. That is, in the postamble, the carrier correlation value C (n, k) according to expression (1) becomes one constant value regardless of whether or not synchronization is achieved.

When symbol synchronization is not achieved, input of the carrier detector 48 becomes input such that the phase rotates at random and the signal points position on the circumference with the origin as the center on the complex plane as at the left of FIG. 13. In contrast, even if symbol synchronization is not achieved, output of the carrier correlator 122 becomes output such that the signal points concentrate on one point on the complex plane as at the right of FIG. 13. Therefore, whether or not the signal points of the output of the carrier correlator 122 concentrate on any point on the complex plane is determined, whereby it is made possible to determine the presence or absence of a postamble, namely, detect a carrier.

The correlation distribution calculator 123 calculates an output distribution of the carrier correlator 122 on the complex plane. The comparison determiner 124 compares the output value of the correlation distribution calculator 123 with a predetermined threshold value for determination and outputs the determination result. For example, the correlation distribution calculator 123 divides the complex plane into areas for each quadrant, etc., finds the number of signal points existing in each area, and calculates the maximum value. If the number of signal points existing in any area on the complex plane exceeds a predetermined number, it can be determined that the signal points of the carrier correlation value concentrates on the area. Therefore, the comparison determiner 124 determines whether or not the output of the correlation distribution calculator 123 exceeds the threshold value, thereby determining the presence or absence of a carrier. The determination result of the comparison determiner 124 is outputs as a carrier detection signal of the carrier detector 48.

Figure 14:
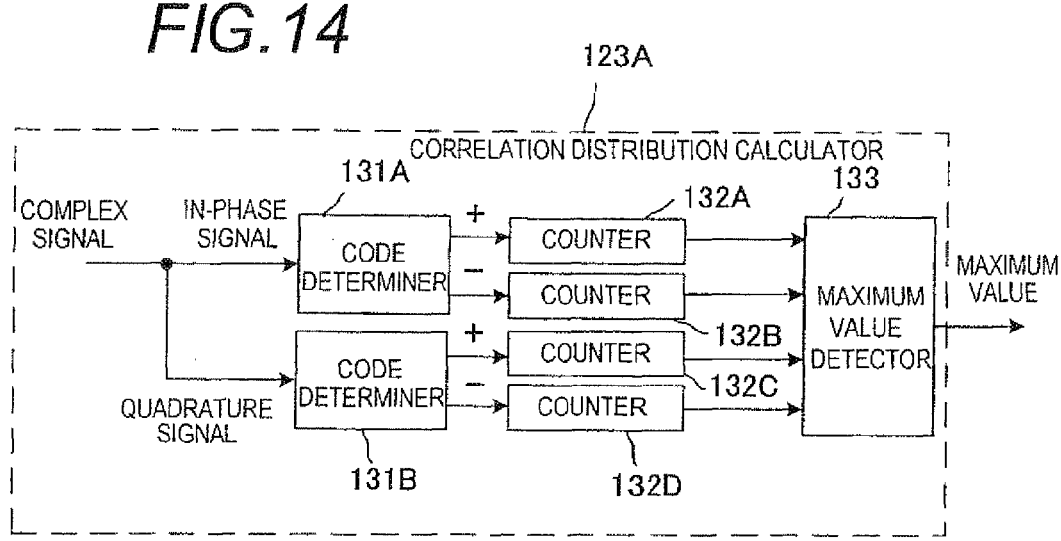
FIG. 14 is a block diagram to show a first example of the configuration of a correlation distribution calculator used in the first embodiment of the invention.
Figure 15:
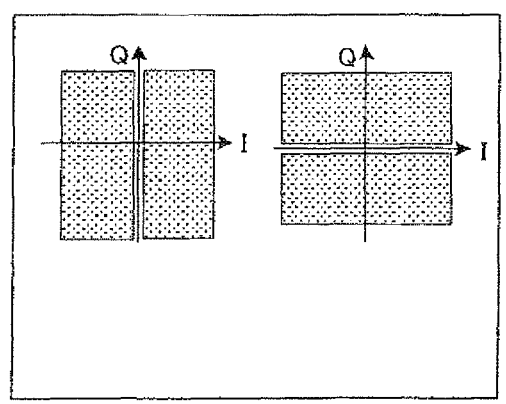
FIG. 15 shows the areas of the signal points on the complex plane counted in the correlation distribution calculator in FIG. 14.

FIG. 14 is a block diagram to show a first example of the configuration of a correlation distribution calculator used in the embodiment of the invention. FIG. 15 shows the areas of the signal points on the complex plane counted in the correlation distribution calculator in FIG. 14. A correlation distribution calculator 123A in the first example includes two code determiners 131A and 131B, four counters 132A, 132B, 132C, and 132D, and a maximum value detector 133.

The correlation distribution calculator 123A determines the code of an in-phase component (I signal component) of an input complex signal by the code determiner 131A and determines the code of a quadrature component (Q signal component) by the code determiner 131B. The correlation distribution calculator 123A counts the numbers of positive and negative signal points output by the code determiners 131A and 131B by the counters 132A to 132D. Accordingly, the number of carriers existing in each of the first to fourth quadrants on the complex plane is counted as an output distribution of the carrier correlator 122 on the complex plane, as shown in FIG. 15. Upon completion of counting the numbers of the signal points for all subcarriers, the correlation distribution calculator 123A detects and outputs the maximum value of the counts of the counters 132A to 132D by the maximum value detector 133.

If the count of any one of the counters 132A to 132D is large and the maximum value output by the maximum value detector 133 exceeds a predetermined value, it is considered that the signal points of the output of the carrier correlator 122 concentrate on any area on the complex plane. The comparison determiner 124 of the carrier detector 48 sets a threshold value to 0.75, for example, and compares the ratio of the total number of use carriers of multicarrier signal to the count of the carriers existing in a specific quadrant on the complex plane (namely, the maximum value of output of the correlation distribution calculator 123) with the threshold value. At this time, threshold value<(count/(total number of use carriers)). If the ratio exceeds the threshold value, it is determined that carrier is detected.

Figure 16:
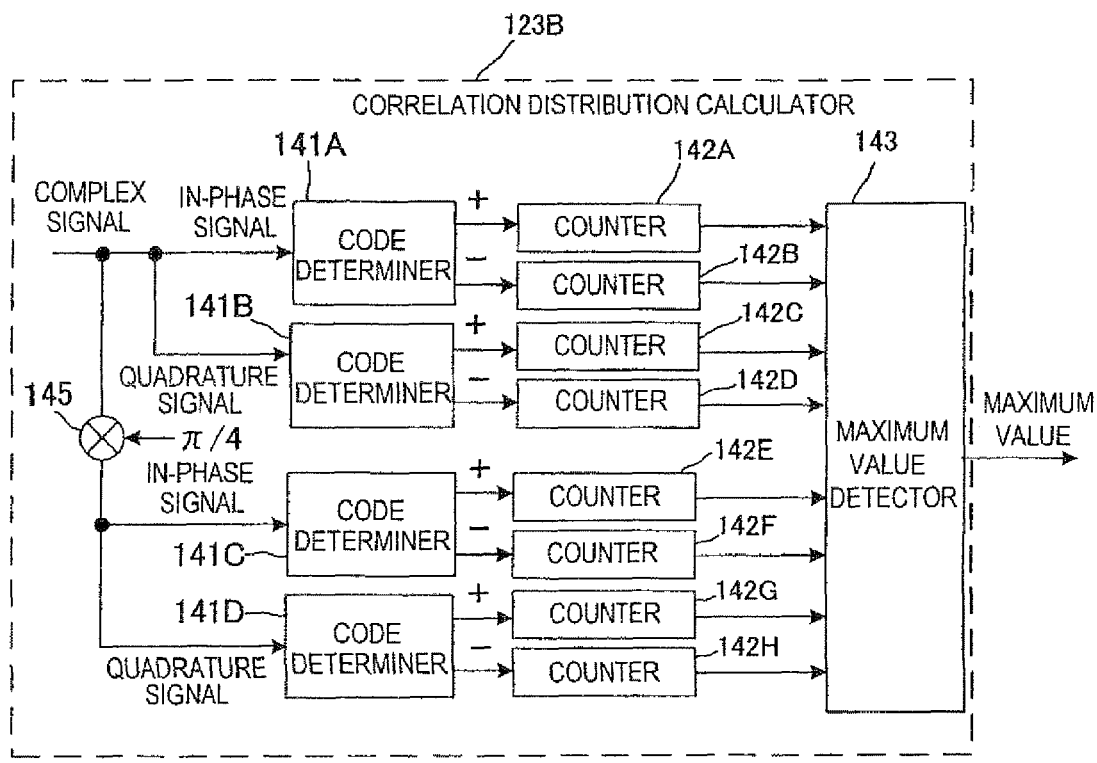
FIG. 16 is a block diagram to show a second example of the configuration of a correlation distribution calculator used in the first embodiment of the invention.

FIG. 16 is a block diagram to show a second example of the configuration of a correlation distribution calculator used in the embodiment of the invention. FIG. 17 shows the areas of the signal points on the complex plane counted in the correlation distribution calculator in FIG. 16. A correlation distribution calculator 123B in the second example includes a phase rotator 145, four code determiners 141A, 141B, 141C, and 141D, eight counters 142A, 142B, 142C, 142D, 142E, 142F, 142G, and 142H, and a maximum value detector 143.

The correlation distribution calculator 123B determines the code of an in-phase component of an input complex signal by the code determiner 141A, determines the code of a quadrature component by the code determiner 141B, determines the code of an in-phase component of a signal provided by $\pi/4$ rotating the phase of the complex signal by the code determiner 141C, and determines the code of a quadrature component by the code determiner 141D. The correlation distribution calculator 123B counts the numbers of positive and negative signal points output by the code determiners 141A to 141D by the counters 142A to 142H. Accordingly, the correlation distribution calculator 123B counts the number of carriers existing in the area corresponding to each quadrant in a state in which the IQ axis of the complex plane is rotated $\pi/4$ (45°) (each quadrant in a state in which each signal point is rotated $\pi/4$ on the complex plane) in parallel with counting the number of carriers existing in each of the first to fourth quadrants on the complex plane, as shown in FIG. 17. In the second example, the output distribution of the carrier correlator 122 on the complex plane can be detected more accurately and erroneous detection can be decreased, so that the detection accuracy of the maximum value in the maximum value detector 143 can be enhanced. Accordingly, the carrier detection accuracy of the carrier detector 48 can be enhanced.

Second Embodiment

Figure 18:
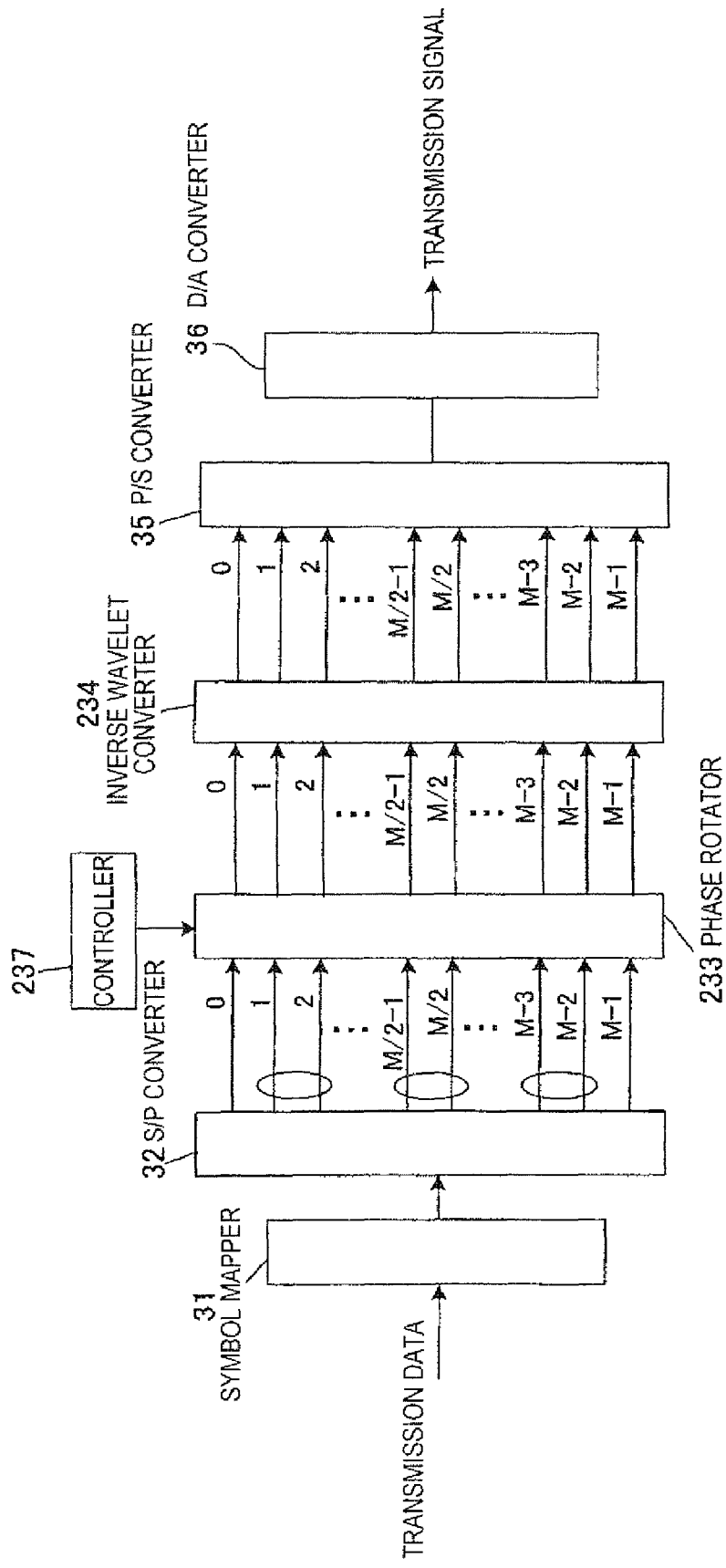
FIG. 18 is a block diagram to show the configuration of a transmitting apparatus according to a second embodiment of the invention.

FIG. 18 is a block diagram to show the configuration of a transmitting apparatus according to a second embodiment of the invention. FIG. 18 shows a configuration example of the main part of a communication apparatus which becomes the transmitting apparatus in the second embodiment. In the configuration example, inverse wavelet transform (IDWT) is used for modulation of a multicarrier signal. The transmitting apparatus includes a symbol mapper 31, an S/P converter 32, a phase rotator 233, an inverse wavelet converter 234, a P/S converter 35, a D/A converter 36, and a controller 37. In the following embodiments, description is given centering around different portions from the first embodiment and a similar configuration and operation will not be discussed again.

The phase rotator 233 rotates the phase of the parallel data corresponding to each subcarrier in accordance with a control signal from the controller 237. To use inverse wavelet transform, a subcarrier pair (a pair of adjacent subcarriers) forms complex information. In FIG. 18, two signal lines enclosed with an ellipse indicate a subcarrier pair. Therefore, the "2n−1"th (n is a positive integer) input is an in-phase component of the complex information, the 2n'th input is a quadrature component of the complex information (where $1 \leq n \leq M/2-1$), the subcarrier numbers are considered to be 0 to M−1, complex subcarrier is formed of a subcarrier pair, and the phase of each subcarrier pair is rotated as with use of inverse Fourier transform. That is, a phase rotation angle of "0" or "$\pi$," for example, is given for each subcarrier pair and the phase is rotated. Unlike the case of using inverse Fourier transform, the maximum number of the parallel data pieces whose phase is rotated is M/2−1.

The inverse wavelet converter 234 performs IDWT of the parallel data whose phase has been rotated and converts the data into a frequency domain. The inverse wavelet converter 234 performs inverse wavelet transform of the parallel data of each subcarrier whose phase has been rotated, performs multicarrier modulation, and generates a multicarrier transmission signal. The order of the symbol mapper 31 and the S/P converter 32 can also be changed.

The controller 237 controls the whole operation of the transmitting apparatus and transmission data. It supplies a control signal to the phase rotator 233 and controls setting and change of a phase vector. Specifically, the controller 237 controls the phase rotation operation of the phase rotator 233 based on the sending timings of a preamble and a postamble of transmission data and assigns a specific phase vector to the transmission data. The controller 237 uses a specific bit series of pseudo random values having two values of "0" and "$\pi$" based on a PN series, for example, and generates a bit series based on a specific cyclic shift amount as in the first embodiment. The controller 237 supplies the bit series to the phase rotator 233 as a control signal of a phase vector and rotates the phase for each target subcarrier pair, thereby setting a predetermined phase vector. At this time, the controller 237 sets different phase vectors in the preamble and the postamble and switches the phase vector of the phase rotator 233 in synchronization with the timing of each of the preamble sending time and the postamble sending time.

Figure 19:
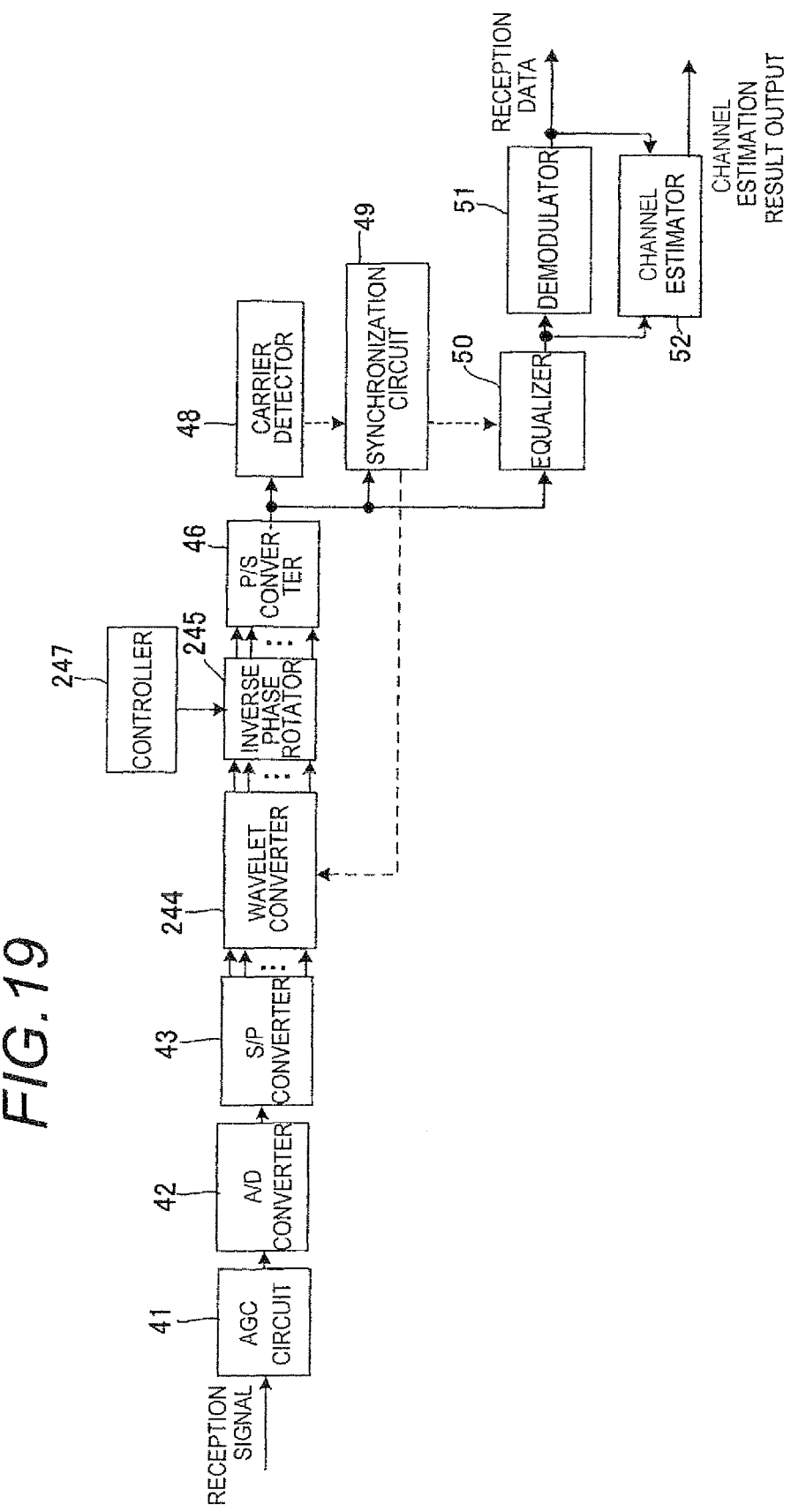
FIG. 19 is a block diagram to show the configuration of a receiving apparatus according to the second embodiment of the invention.
Figure 20:
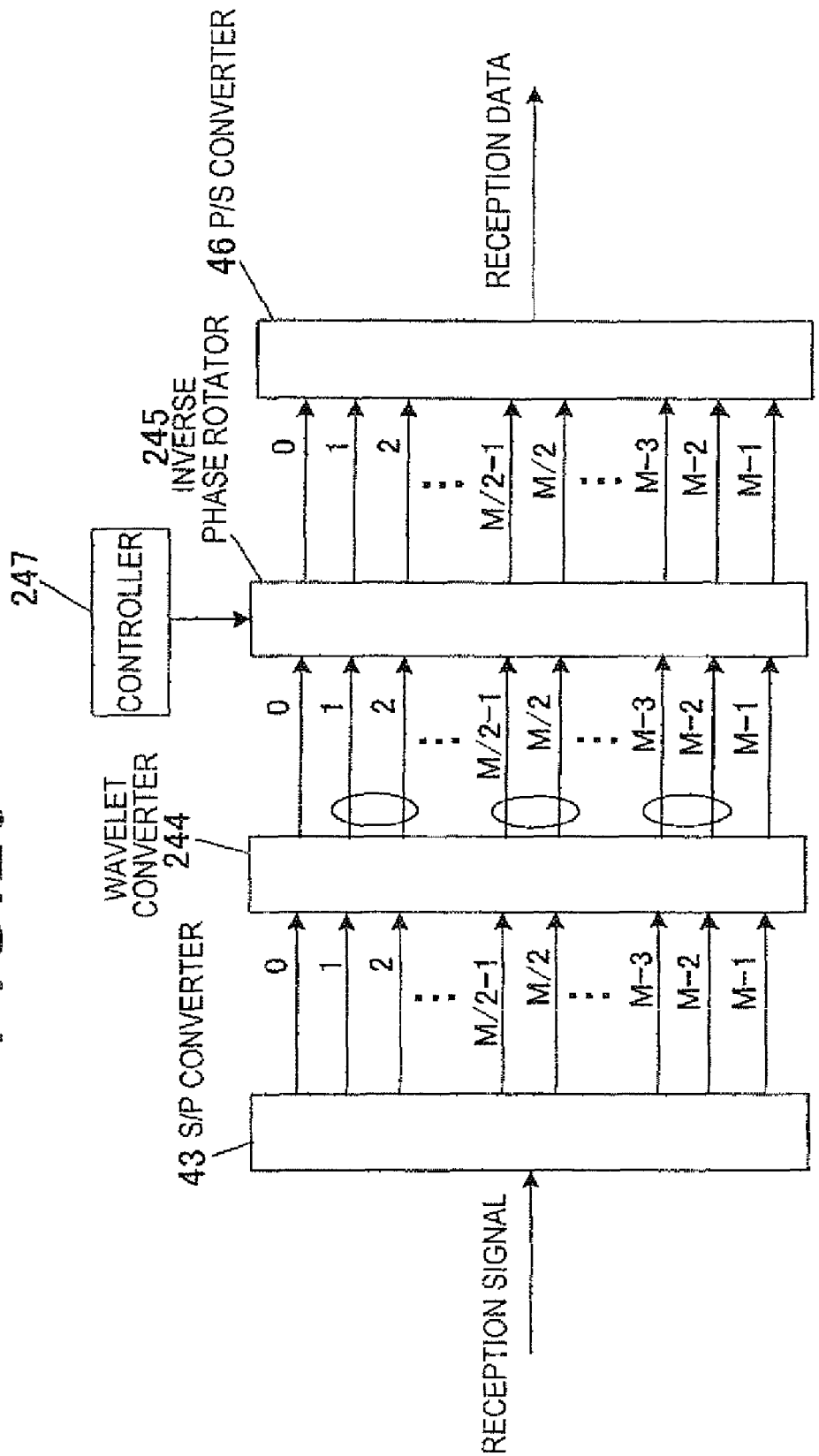
FIG. 20 is a block diagram to show the configuration of the portion concerning a phase vector of the receiving apparatus according to the second embodiment of the invention.

FIG. 19 is a block diagram to show the configuration of a receiving apparatus according to the second embodiment of the invention. FIG. 20 is a block diagram to show the configuration of the portion concerning a phase vector, of the receiving apparatus according to the second embodiment of the invention. FIGS. 19 and 20 show a configuration example of the main part of the communication apparatus which becomes the receiving apparatus in the second embodiment. In the configuration example, wavelet transform (DWT) is used for demodulation of a multicarrier signal. The receiving apparatus includes an AGC circuit 41, an A/D converter 42, an S/P converter 43, a wavelet converter 244, an inverse phase rotator 245, a P/S converter 46, a controller 247, a carrier detector 48, a synchronization circuit 49, an equalizer 50, a demodulator 51, and a channel quality estimator 52.

The wavelet converter 244 performs DWT of parallel data and converts the data into a time domain. The wavelet converter 244 performs wavelet transform of the parallel data of each subcarrier, performs multicarrier demodulation, and generates reception data of parallel data corresponding to each subcarrier of the multicarrier signal.

The inverse phase rotator 245 rotates the phase of the parallel data corresponding to each subcarrier in accordance with a control signal from the controller 247 and restores the phase of each data piece to the former. In FIG. 20, two signal lines enclosed with an ellipse indicate a subcarrier pair. Unlike the case of using Fourier transform, the maximum number of the parallel data pieces whose phase is rotated is M/2−1. Changing the order of the inverse phase rotator 245 and the P/S converter 46 does not interfere with the operation.

The controller 247 controls the whole operation of the receiving apparatus. It supplies a control signal to the inverse phase rotator 245 and controls setting and change of a phase vector to be rerotated. Specifically, the controller 247 controls the phase rotation operation of the inverse phase rotator 245 and restores the phase rotation of the data of each subcarrier to the former according to a specific phase vector. The controller 247 uses a specific bit series of pseudo random values having two values of "0" and "π" based on a PN series, for example, and generates a bit series based on a specific cyclic shift amount as in the first embodiment. The controller 247 supplies the bit series to the inverse phase rotator 245 as a control signal of a phase vector and rotates the phase for each target subcarrier pair. In this case, the control signal of the phase vector becomes an inverse code to that of the transmitting apparatus. Accordingly, the phase of the data of each subcarrier is restored (rerotated) according to a predetermined setup phase vector. At this time, the controller 247 sets different phase vectors in the preamble and the postamble and switches the phase vector of the inverse phase rotator 245 in response to the preceding preamble or postamble detection result.

Thus, in the configuration using wavelet transform in place of FFT, the receiving apparatus can also determine the preamble and the postamble and detect a carrier as in the first embodiment. Therefore, the receiving apparatus can start reception processing according to detection of the preamble and can perform reception termination processing according to detection of the postamble.

Third Embodiment

Figure 21:
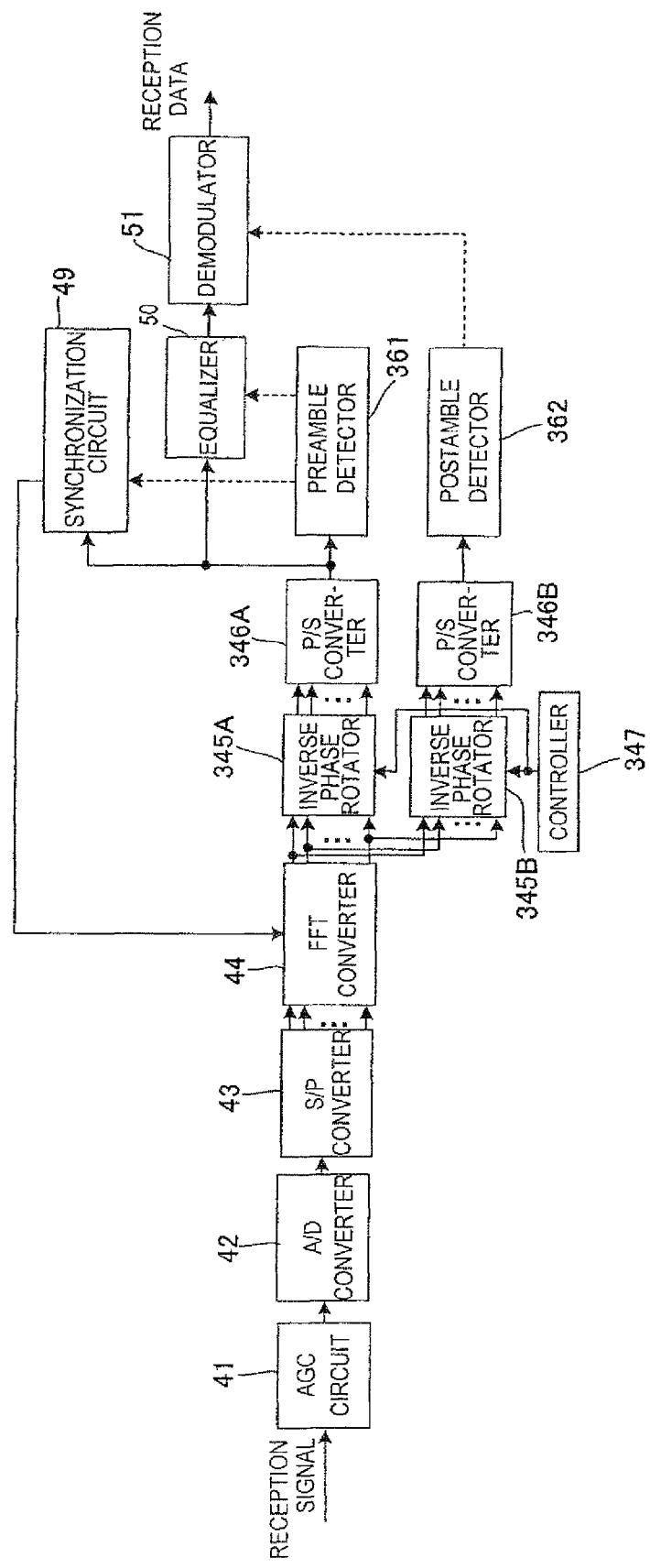
FIG. 21 is a block diagram to show the configuration of a receiving apparatus according to a third embodiment of the invention.

FIG. 21 is a block diagram to show the configuration of a receiving apparatus according to a third embodiment of the invention. The third embodiment shows a configuration for detecting a preamble and a postamble in parallel in the receiving apparatus. The receiving apparatus includes an AGC circuit 41, an A/D converter 42, an S/P converter 43, an FFT converter 44, an inverse phase rotator 345A, an inverse phase rotator 345B, a P/S converter 346A, a P/S converter 346B, a controller 347, a preamble detector 361, a postamble detector 362, a synchronization circuit 49, an equalizer 50, and a demodulator 51. The channel of the inverse phase rotator 345A, the P/S converter 346A, and the preamble detector 361 and the channel of the inverse phase rotator 345B, the P/S converter 346B, and the postamble detector 362 are provided in parallel on the output side of the FFT converter 44. The synchronization circuit 49 and the equalizer 50 are connected to the output side of the P/S converter 346A.

FIG. 21 shows a configuration example including the FFT converter. Alternatively, the configuration can also be applied in a similar manner if a wavelet converter is included in place of the FFT converter.

The inverse phase rotator 345A sets phase vector A for a preamble and rotates the phase of the parallel data corresponding to each subcarrier in accordance with a control signal from the controller 347. The P/S converter 346A inputs parallel data corresponding to each subcarrier of a multicarrier signal output by the inverse phase rotator 345A and converts the parallel data into serial data. The order of the inverse phase rotator 345A and the P/S converter 346A may be exchanged to each other.

The inverse phase rotator 345B sets phase vector B for a postamble and rotates the phase of the parallel data corresponding to each subcarrier in accordance with a control signal from the controller 347. The P/S converter 346B inputs parallel data corresponding to each subcarrier of a multicarrier signal output by the inverse phase rotator 345B and converts the parallel data into serial data. The order of the inverse phase rotator 345B and the P/S converter 346B may be exchanged to each other.

The controller 347 outputs a control signal for setting the phase vector A for a preamble to the inverse phase rotator 345A. The controller 347 outputs a control signal for setting the phase vector B for a postamble to the inverse phase rotator 345B.

Each of the preamble detector 361 and the postamble detector 362 has a configuration and a function similar to those of the carrier detector 48 in FIG. 6. The preamble detector 361 inputs reception data whose phase has been restored (rerotated) using the phase vector A for a preamble by the inverse phase rotator 345A, performs carrier detection, and detects the presence or absence of a preamble. A preamble detection signal from the preamble detector 361 is output to the synchronization circuit 49 and the equalizer 50 and is used for reception start processing. Here, it is assumed that the phase vector of the data part between the preamble and the postamble is made the same as the postamble.

The postamble detector 362 inputs reception data whose phase has been restored (rerotated) using the phase vector B for a postamble by the inverse phase rotator 345B, performs carrier detection, and detects the presence or absence of a postamble. A postamble detection signal from the postamble detector 362 is output to the demodulator 51 and is used for reception termination processing.

The preamble detector 361 and the postamble detector 362 operate in parallel and preamble detection processing and postamble detection processing are performed in parallel. Since each of the preamble detector 361 and the postamble detector 362 has a simple configuration similar to that of the carrier detector, if they are provided in parallel, the circuit scale does not become so large.

Figure 22:
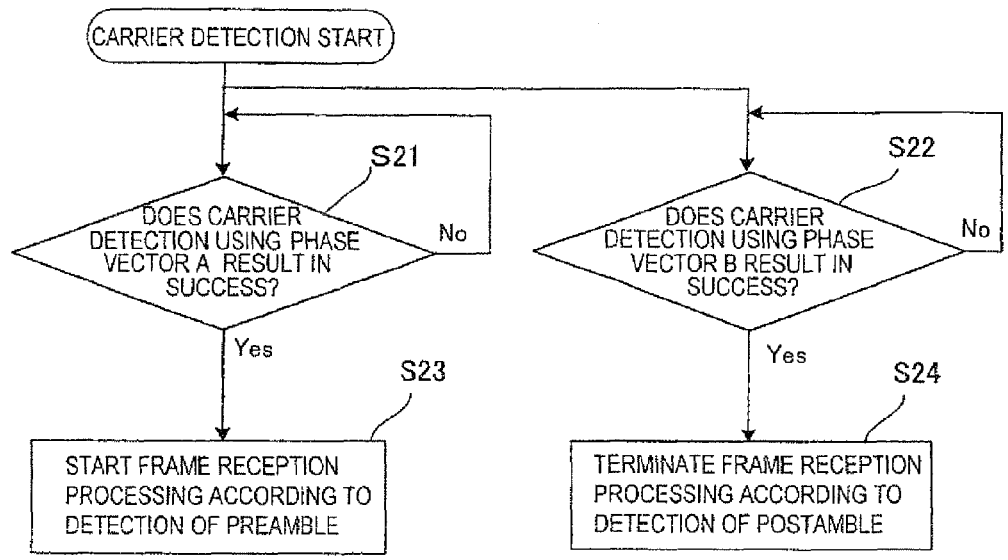
FIG. 22 is a flowchart to show a first example of the operation of carrier detection and reception processing in the receiving apparatus of the third embodiment of the invention.

FIG. 22 is a flowchart to show a first example of the operation of carrier detection and reception processing in the receiving apparatus of the third embodiment of the invention. When carrier detection is started under the control of the controller 347, the preamble detector 361 determines the presence or absence of a preamble and concurrently the postamble detector 362 determines the presence or absence of a postamble. That is, whether or not carrier detection using the phase vector A in the preamble detector 361 results in success is determined (step S21) and whether or not carrier detection using the phase vector B in the postamble detector 362 results in success is determined (step S22). The carrier detection processing operates at all times and if a carrier is detected, the controller 347 performs processing responsive to the preamble or the postamble.

If carrier detection using the phase vector A results in success, namely, if a preamble is detected, the controller 347 starts frame reception processing according to detection of the preamble (step S23). In this case, based on a preamble detection signal, the controller 347 performs synchronization processing by the synchronization circuit 49 and equalization coefficient estimation by the equalizer 50, starts demodulation processing of frame control and a payload in the demodulator 51, and acquires reception data. If carrier detection using the phase vector B results in success, namely, if a postamble is detected, the controller 347 terminates the frame reception processing according to detection of the postamble (step S24). In this case, the controller 347 outputs a postamble detection signal for indicating the end of the data part and terminates the demodulation processing in the demodulator 51.

Figure 23:
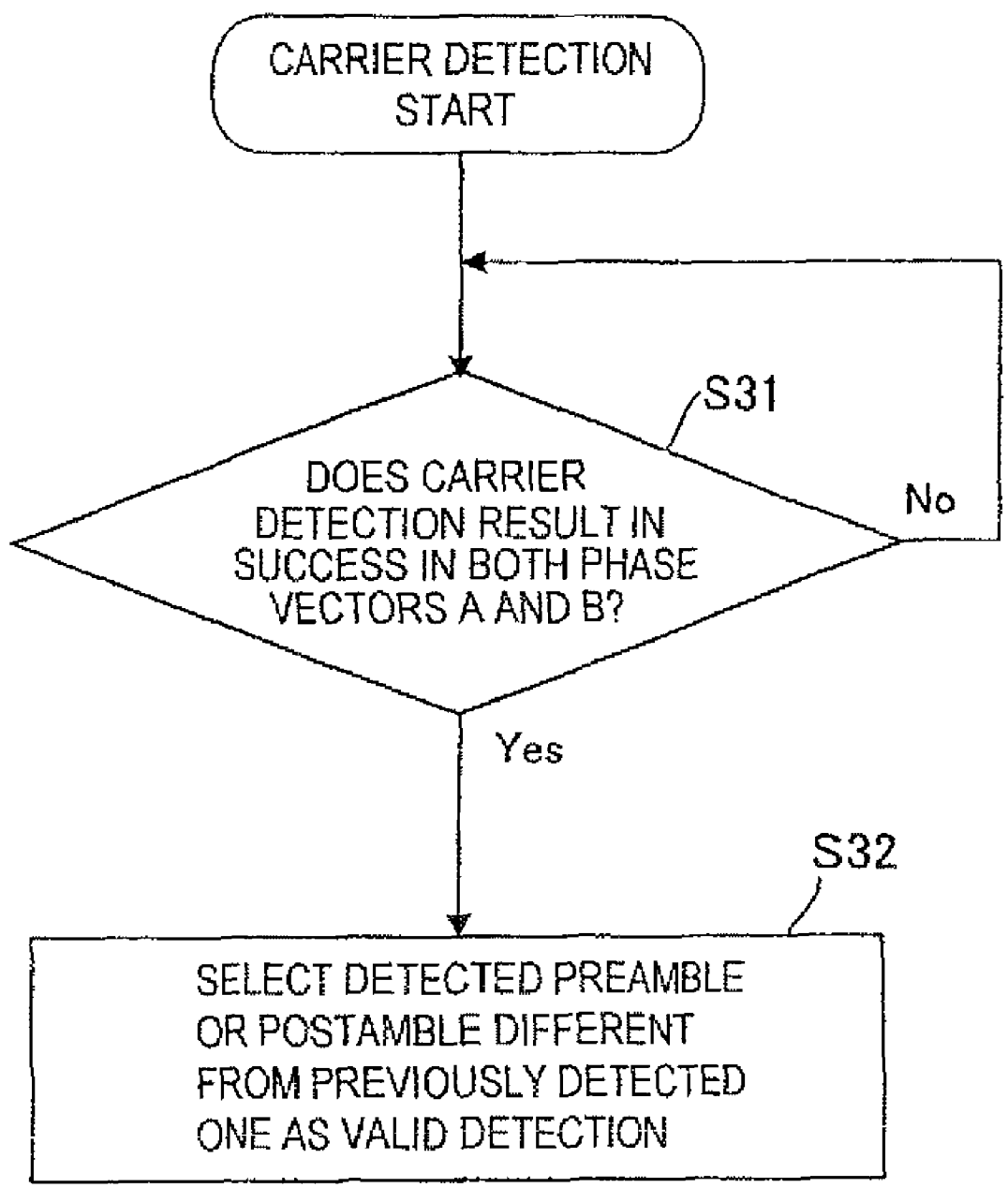
FIG. 23 is a flowchart to show a second example of the operation of carrier detection and reception processing in the receiving apparatus of the third embodiment of the invention.

FIG. 23 is a flowchart to show a second example of the operation of carrier detection and reception processing in the receiving apparatus of the third embodiment of the invention. The second example shows processing when carrier detection results in success in both the phase vectors A and B. In this case, whether or not carrier detection using the phase vector A in the preamble detector 361 results in success and carrier detection using the phase vector B in the postamble detector 362 results in success is determined (step S31).

If carrier detection results in success in both the phase vectors A and B, either detection result is erroneous detection and therefore the controller 347 performs processing responsive to the preceding detection result. That is, the controller 347 selects the detected preamble or postamble different from the previously detected one as valid detection (S32). Specifically, if a preamble is previously detected, then the next is a postamble and therefore, it is determined that a postamble is detected, and the reception processing is terminated. On the other hand, if a postamble is previously detected, then the next is a preamble and therefore, it is determined that a preamble is detected, and the reception processing is started.

Thus, in the third embodiment, it is made possible for the receiving apparatus to detect a preamble and a postamble in parallel using the phase vectors A and B and appropriately execute reception start processing and reception termination processing responsive to detection. Therefore, if the length of the data part in a packet is made variable and a postamble is provided in the transmitting apparatus, the receiving apparatus can determine a postamble without the need for symbol synchronization and communication processing in each apparatus can be executed appropriately.

Fourth Embodiment

Figure 24:
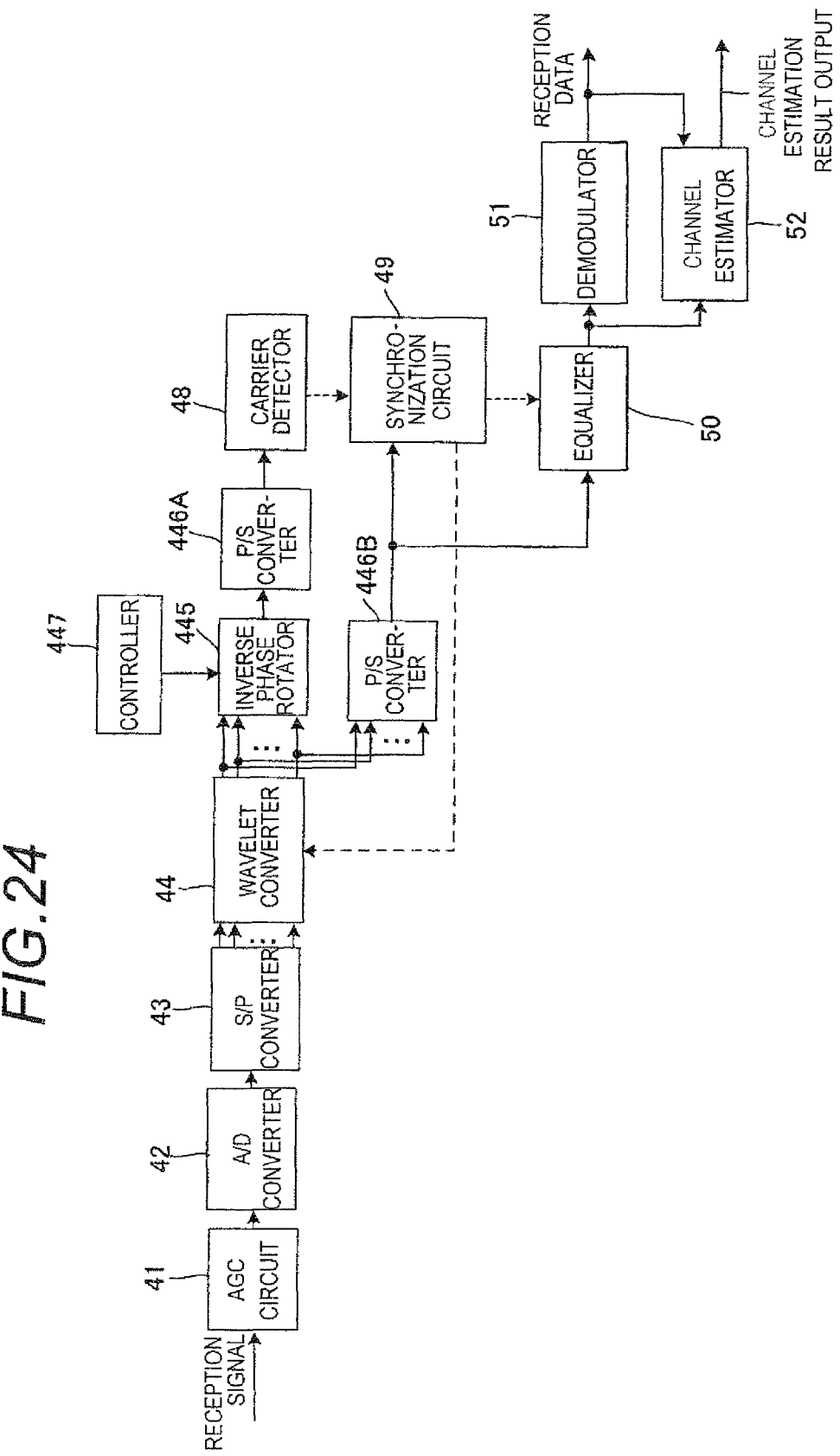
FIG. 24 is a block diagram to show the configuration of a receiving apparatus according to a fourth embodiment of the invention.

FIG. 24 is a block diagram to show the configuration of a receiving apparatus according to a fourth embodiment of the invention. The fourth embodiment shows a configuration for skipping phase vector processing of a data part in the receiving apparatus. The receiving apparatus includes an AGC circuit 41, an A/D converter 42, an S/P converter 43, an FFT converter 44, an inverse phase rotator 445, a P/S converter 446A, a P/S converter 446B, a controller 447, a carrier detector 48, a synchronization circuit 49, an equalizer 50, a demodulator 51, and a channel quality estimator 52. The channel of the inverse phase rotator 445 and the P/S converter 446A and the channel of the P/S converter 446 are provided in parallel on the output side of the FFT converter 44.

FIG. 24 shows a configuration example including the FFT converter. Alternatively, the configuration can also be applied in a similar manner if a wavelet converter is included in place of the FFT converter.

The inverse phase rotator 445 sets phase vector A for a preamble or phase vector B for a postamble and rotates the phase of the parallel data corresponding to each subcarrier in accordance with a control signal from the controller 447. The P/S converter 446A inputs parallel data corresponding to each subcarrier of a multicarrier signal output by the inverse phase rotator 445 and converts the parallel data into serial data. The controller 447 switches the phase vector of the inverse phase rotator 445 to the phase vector A or the phase vector B in response to the preceding preamble or postamble detection result.

The carrier detector 48 detects the presence or absence of a carrier from data whose phase has been restored (rerotated) according to the phase vector A or the phase vector B, thereby detecting a preamble or a postamble. The order of the inverse phase rotator 445 and the P/S converter 446A may be changed. If the inverse phase rotator is provided at a later stage of the P/S converter, the number of P/S converters provided in parallel in the example shown in the figure can be decreased to one.

The P/S converter 446B converts parallel data corresponding to each subcarrier of a multicarrier signal output from the FFT converter 44 into serial data and outputs the serial data to the synchronization circuit 49 and the equalizer 50. Synchronization processing is performed in the synchronization circuit 49, equalization coefficient estimation is performed in the equalizer 50, demodulation processing of frame control and a payload after equalization is executed in the demodulator 51, and reception data is acquired.

Thus, in the fourth embodiment, the receiving apparatus detects a preamble and a postamble using the phase vector A or B. For the data part containing frame control and a payload, data not passed through the inverse phase rotator and not subjected to phase rotation is subjected to demodulation processing as it is. Therefore, if phase rotation is not given to the phase vector of the data part in the transmitting apparatus, accordingly the receiving apparatus can appropriately execute demodulation processing of the data part as well as detects a preamble and a postamble.

Fifth Embodiment

Figure 25:
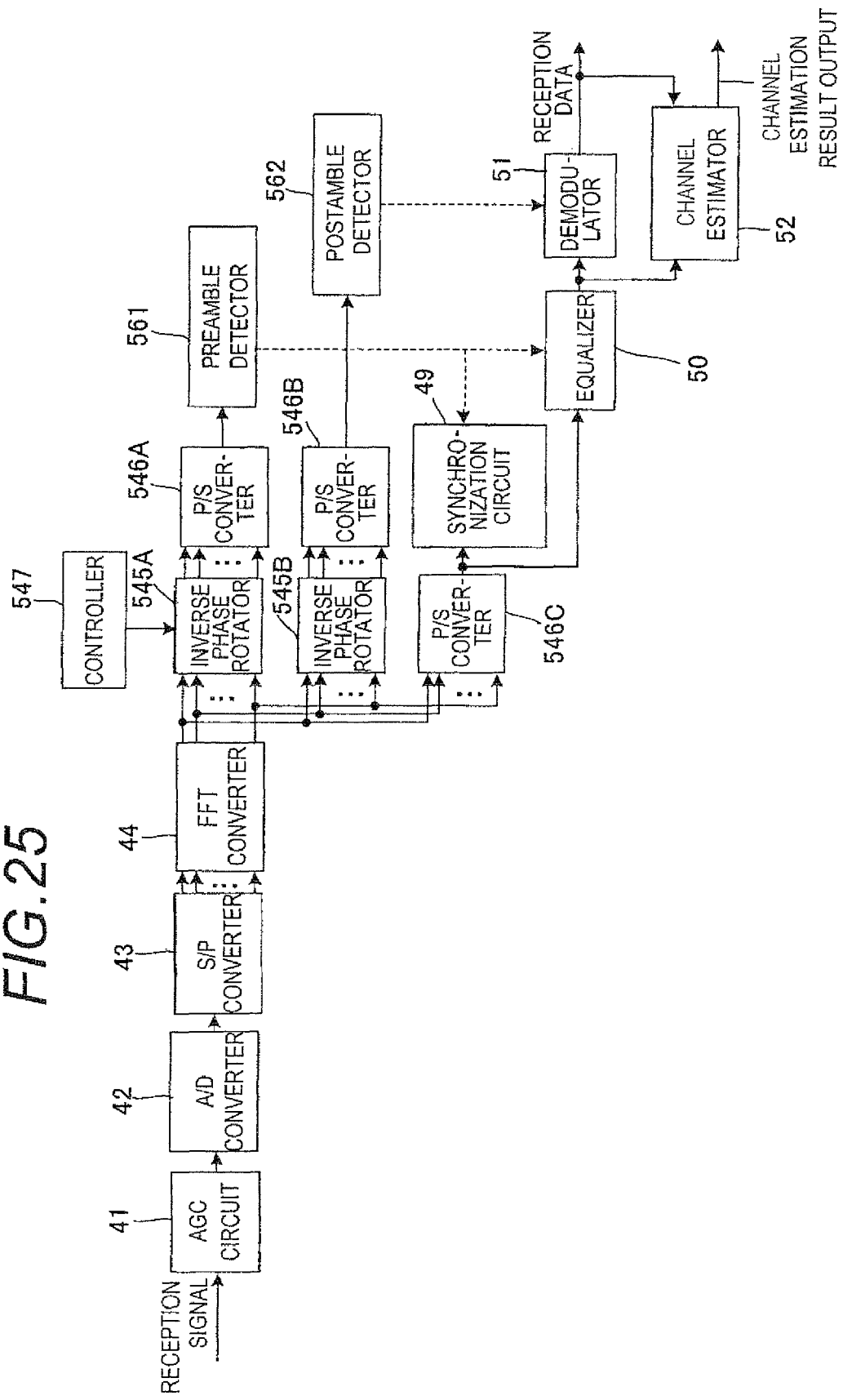
FIG. 25 is a block diagram to show the configuration of a receiving apparatus according to a fifth embodiment of the invention.

FIG. 25 is a block diagram to show the configuration of a receiving apparatus according to a fifth embodiment of the invention. The fifth embodiment shows a configuration for detecting a preamble and a postamble in parallel and skipping phase vector processing of a data part in the receiving apparatus. The receiving apparatus includes an AGC circuit 41, an A/D converter 42, an S/P converter 43, an FFT converter 44, an inverse phase rotator 545A, an inverse phase rotator 545B, a P/S converter 546A, a P/S converter 546B, a P/S converter 546C, a controller 547, a preamble detector 561, a postamble detector 562, a synchronization circuit 49, an equalizer 50, a demodulator 51, and a channel quality estimator 52. The channel of the inverse phase rotator 545A, the P/S converter 546A, and the preamble detector 561, the channel of the inverse phase rotator 545B, the P/S converter 546B, and the postamble detector 562, and the channel of the P/S converter 546C are provided in parallel on the output side of the FFT converter 44.

Although FIG. 25 shows a configuration example including the FFT converter, the configuration can also be applied in a similar manner if a wavelet converter is included in place of the FFT converter.

The inverse phase rotator 545A sets phase vector A for a preamble and rotates the phase of the parallel data corresponding to each subcarrier in accordance with a control signal from the controller 547. The P/S converter 546A converts parallel data of output of the inverse phase rotator 545A into serial data. The preamble detector 561 inputs reception data whose phase has been restored (rerotated) using phase vector A for a preamble by the inverse phase rotator 545A, performs carrier detection, and detects the presence or absence of a preamble.

The inverse phase rotator 545B sets phase vector B for a postamble and rotates the phase of the parallel data corresponding to each subcarrier in accordance with a control signal from the controller 547. The P/S converter 546B converts parallel data of output of the inverse phase rotator 545B into serial data. The postamble detector 562 inputs reception data whose phase has been restored (rerotated) using phase vector B for a postamble by the inverse phase rotator 545B, performs carrier detection, and detects the presence or absence of a postamble.

The P/S converter 546C converts parallel data corresponding to each subcarrier of a multicarrier signal output from the FFT converter 44 into serial data and outputs the serial data to the synchronization circuit 49 and the equalizer 50. Synchronization processing is performed in the synchronization circuit 49, equalization coefficient estimation is performed in the equalizer 50, demodulation processing of frame control and a payload after equalization is executed in the demodulator 51, and reception data is acquired. The order of the inverse phase rotator 545A and the P/S converter 546A may be changed and the order of the inverse phase rotator 545B and the P/S converter 546B may be changed. If the inverse phase rotator is provided at a later stage of the P/S converter, the number of P/S converters provided in parallel in the example shown in the figure can be decreased to one.

Thus, in the fifth embodiment, the receiving apparatus detects a preamble and a postamble in parallel using the phase vector A the phase vector B. For the data part containing frame control and a payload, data not passed through the inverse phase rotator and not subjected to phase rotation is subjected to demodulation processing as it is. Therefore, if phase rotation is not given to the phase vector of the data part in the transmitting apparatus, accordingly the receiving apparatus can appropriately execute demodulation processing of the data part as well as detects a preamble and a postamble.

To apply any other phase vector different from a preamble or a postamble to the data part in the fourth or fifth embodiment, an inverse phase rotator for performing phase vector processing for the data part may be provided.

Sixth Embodiment

Figure 26:
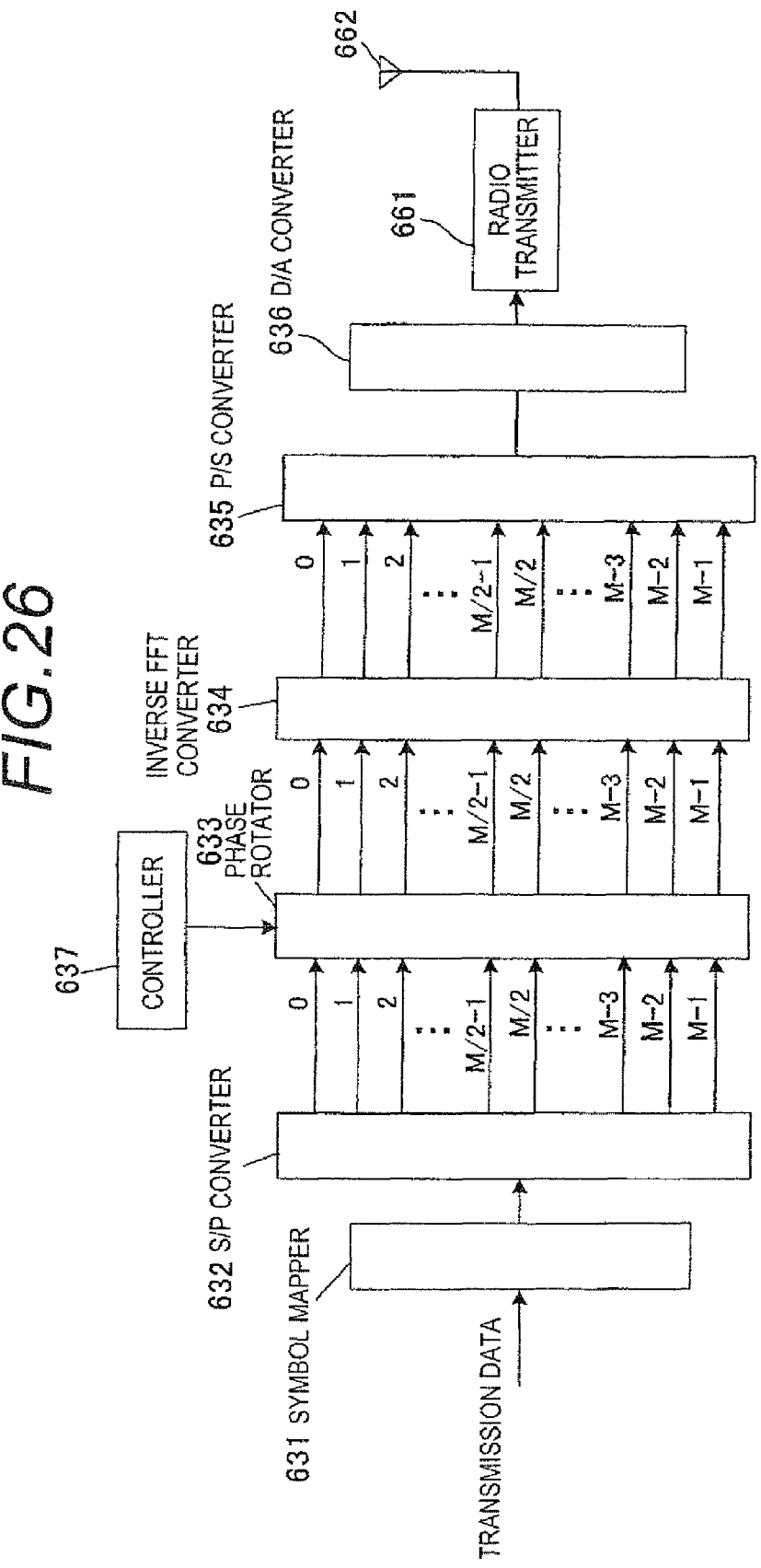
FIG. 26 is a block diagram to show the configuration of a transmitting apparatus according to a sixth embodiment of the invention.
Figure 27:
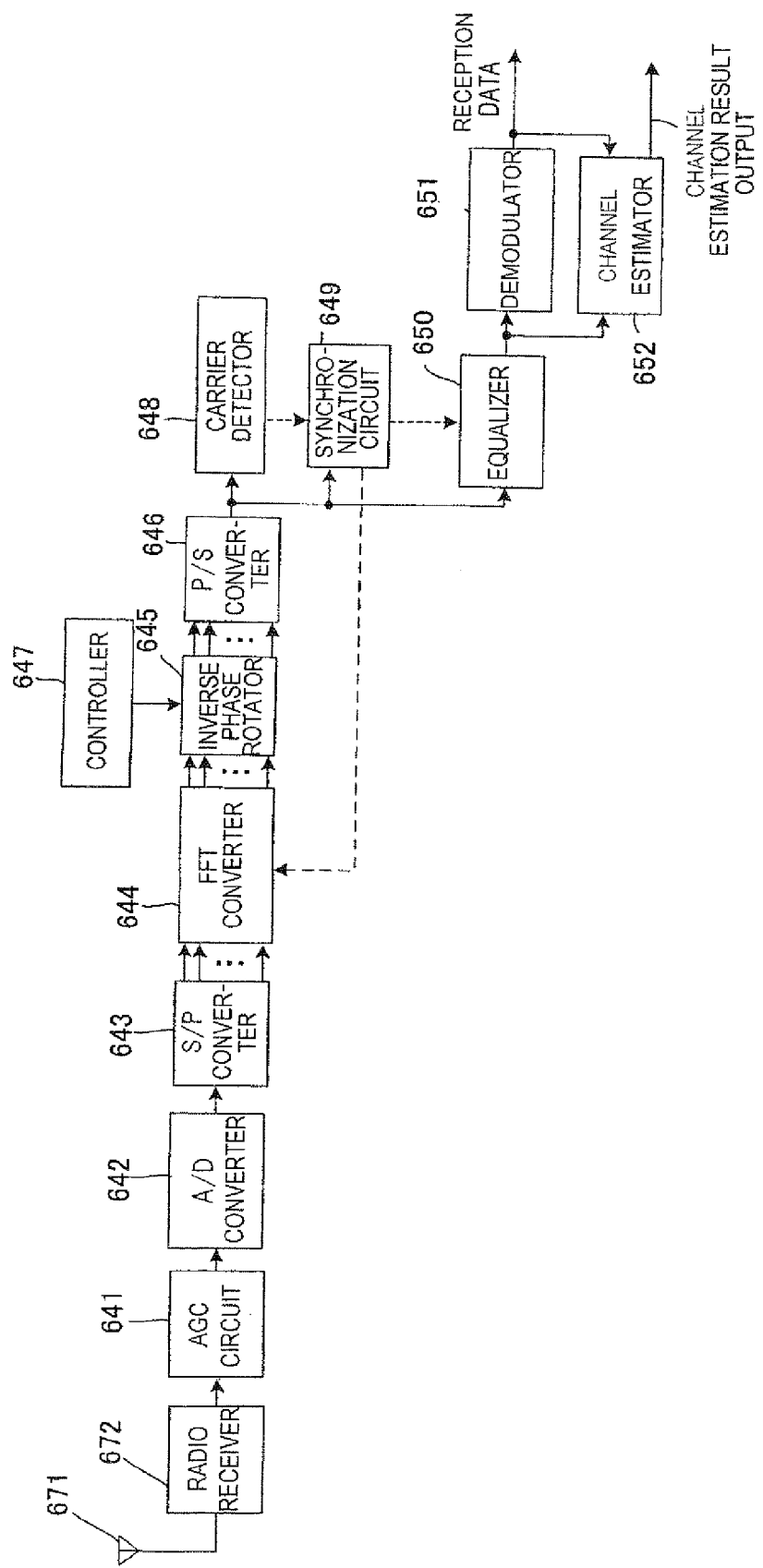
FIG. 27 is a block diagram to show the configuration of a receiving apparatus according to the sixth embodiment of the invention.

A sixth embodiment of the invention shows configuration examples of a transmitting apparatus and a receiving apparatus when each apparatus is applied to a wireless communication apparatus for conducting communications using a radio link. FIG. 26 is a block diagram to show the configuration of the transmitting apparatus according to the sixth embodiment of the invention. FIG. 27 is a block diagram to show the configuration of the receiving apparatus according to the sixth embodiment of the invention.

The transmitting apparatus includes a symbol mapper 631, an S/P converter 632, a phase rotator 633, an inverse FFT converter 634, a P/S converter 635, a D/A converter 636, a controller 637, a radio transmitter 661, and an antenna 662. The configurations and functions of the symbol mapper 631 to the D/A converter 636 and the controller 637 are similar to those of the first embodiment shown in FIG. 5.

The radio transmitter 661 has a transmission RF unit containing an up converter for converting a transmission signal into a radio frequency band, a power amplifier for amplifying power of the transmission signal, and the like. The transmission signal of the radio frequency band output from the radio transmitter 661 is radiated as a radio wave from the antenna 662 for transmission.

The receiving apparatus includes an antenna 671, a radio receiver 672, an AGC circuit 641, an A/D converter 642, an S/P converter 643, an FFT converter 644, an inverse phase rotator 645, a P/S converter 646, a controller 647, a carrier detector 648, a synchronization circuit 649, an equalizer 650, a demodulator 651, and a channel quality estimator 652. The configurations and functions of the AGC circuit 641 to the channel quality estimator 652 and the controller 647 are similar to those of the first embodiment shown in FIG. 6.

The radio receiver 672 has a reception RF unit containing a down converter for converting a reception signal into a base band, and the like. The reception signal provided by receiving a radio wave at the antenna 671 is converted into a base band by the radio receiver 672 and various types of reception processing are performed in circuitry at the following stage.

Although FIGS. 26 and 27 show the configuration examples using FFT/inverse FFT, the configuration can also be applied in a similar manner if wavelet transform/inverse wavelet transform is used in place of the FFT/inverse FFT.

Thus, the configuration of each of the embodiments described above is applied in the communication apparatus using a radio link, whereby the receiving apparatus can determine a postamble without the need for symbol synchronization and communication processing in each apparatus can be executed appropriately.

Seventh Embodiment

Figure 28:
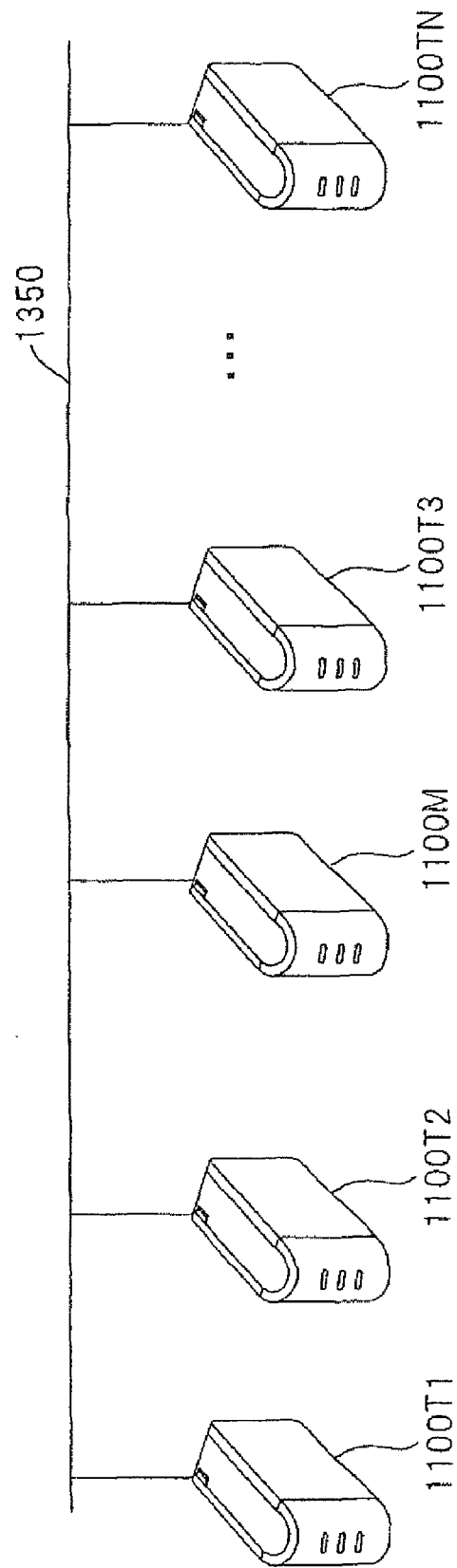
FIG. 28 shows the configuration of a power line communication system according to a seventh embodiment of the invention.

A seventh embodiment of the invention shows a configuration example when it is applied to a power line communication apparatus for conducting communications using a power line as a communication medium. FIG. 28 shows the configuration of a power line communication system according to the seventh embodiment. The power line communication system in FIG. 28 includes PLC modems 1100M, 1100T1, 1100T2, 1100T3, . . . , 1100TN of a plurality of communication apparatus connected to a power line 1350. Although FIG. 28 shows five PLC modems, the number of connected modems may be any number. The PLC modem 1100M functions as a master unit and manages the connection state (link state) of other PLC modems 1100T1, . . . , 1100TN functioning as slave units. However, the PLC modem functioning as the master unit is not indispensable. In the description to follow, the PLC modems are generically called PLC modem 1100.

The power line 1350 is shown as one line in FIG. 28; in fact, however, it is two or more conductor wires and the PLC modem 1100 is connected to two of them.

Figure 29A:
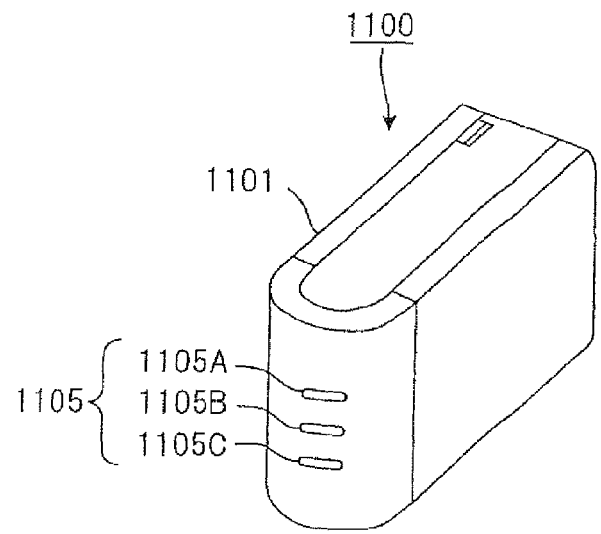
FIGS. 29A to 29C show the appearances of a PLC modem according to the seventh embodiment of the invention.
Figure 29B:
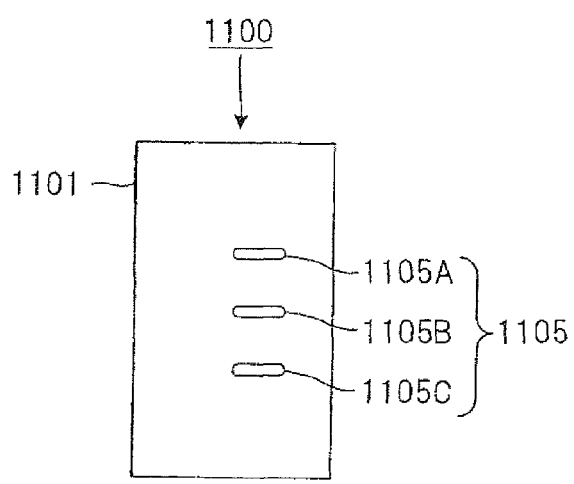
Figure 29C:
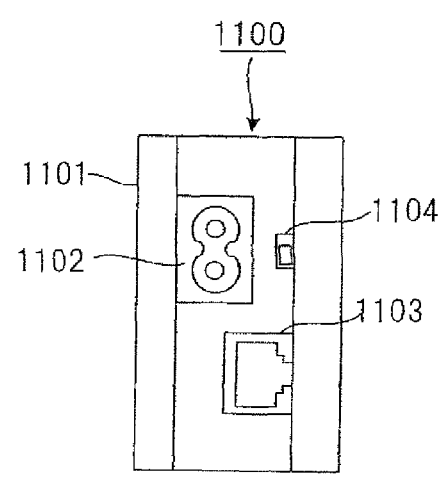

FIGS. 29A to 29C show the appearances of the PLC modem 1100; FIG. 29A is an external perspective view to show the front; FIG. 29B is a front view; and FIG. 29C is a rear view. The PLC modem 1100 shown in FIGS. 29A to 29C has a housing 1101. An indicator 1105 made up of LEDs (Light Emitting Diodes) 1105A, 1105B, and 1105C is provided on the front of the housing 1101 as shown in FIGS. 29A and 29B. A power connector 1102, a LAN (Local Area Network) modular jack 1103 of RJ45, etc., and a changeover switch 1104 for switching the operation mode, etc., are provided on the rear of the housing 1101 as shown in FIG. 29C. A power cable (not shown in FIGS. 29A-29C) is connected to the power connector 1102 and a LAN cable (not shown in FIGS. 29A-29C) is connected to the modular jack 1103. The PLC modem 1100 may be further provided with a Dsub (D-subminiature) connector for connecting a Dsub cable.

Figure 30:
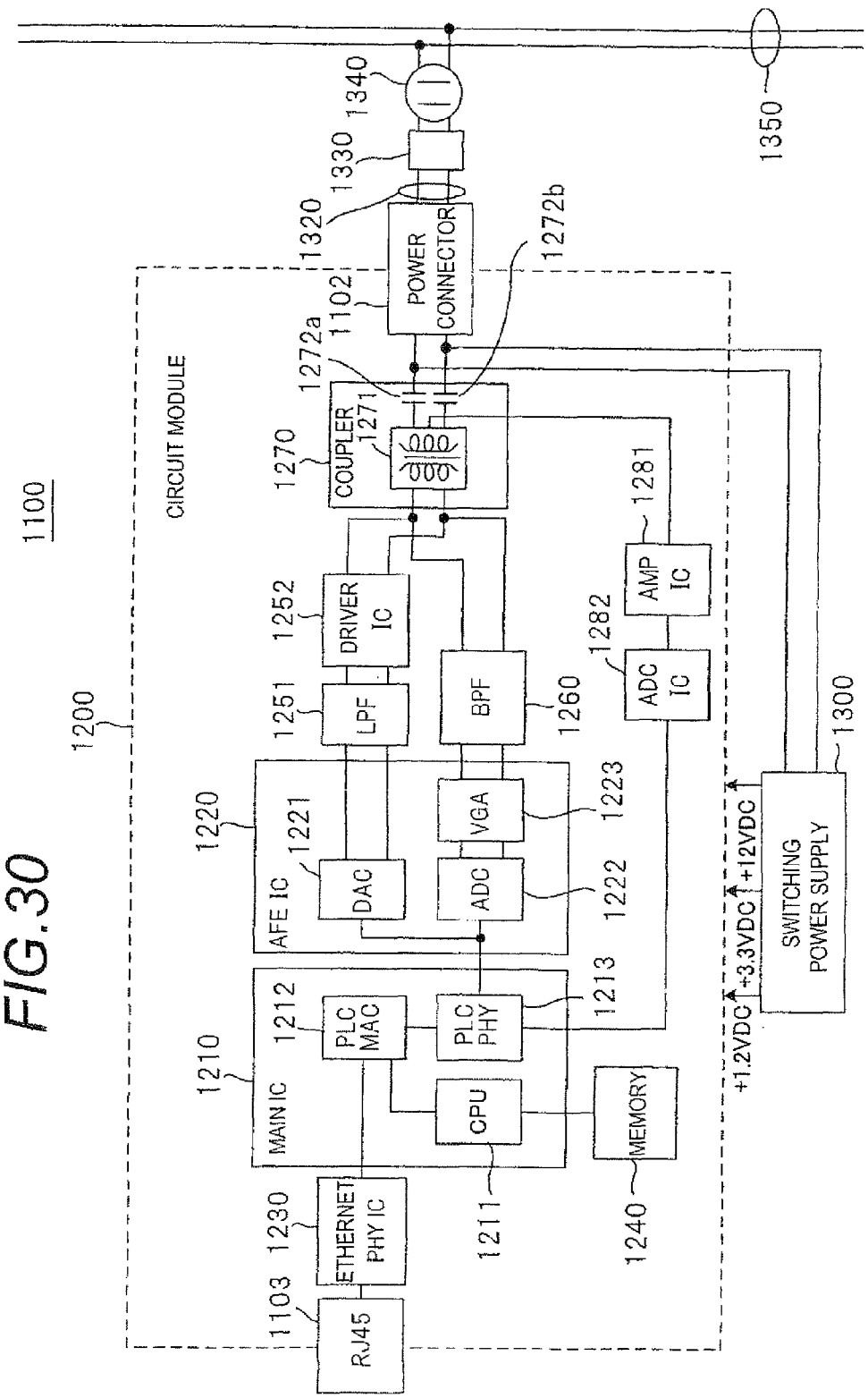
FIG. 30 is a block diagram to show an example of the hardware configuration of the PLC modem according to the seventh embodiment of the invention.

FIG. 30 is a block diagram to show an example of the hardware configuration of the PLC modem 1100. The PLC modem 1100 has a circuit module 1200 and a switching power supply 1300 as shown in FIG. 30. The switching power supply 1300 supplies various voltages (for example, +1.2 V, +3.3 V, and +12 V) to the circuit module 1200; for example, it includes a switching transformer and a DC-DC converter (not shown).

The circuit module 1200 is provided with a main IC (Integrated Circuit) 1210, an AFE IC (Analog Front End Integrated Circuit) 1220, an Ethernet (registered trademark) PHY IC (Physic Layer Integrated Circuit) 1230, memory 1240, a low-pass filter (LPF) 1251, a driver IC 1252, a band-pass filter (BPF) 1260, and a coupler 1270. The switching power supply 1300 and the coupler 1270 are connected to the power connector 1102 and further are connected to the power line 1350 through a power cable 1320, a power plug 1330, and a socket 1340. The main IC 1210 functions as a control circuit for conducting power line communications.

The main IC 1210 includes a CPU (Central Processing Unit) 1211, a PLC MAC (Power Line Communication Media Access Control layer) block 1212, and a PLC PHY (Power Line Communication Physical layer) block 1213. The CPU 1211 installs a 32-bit RISC (Reduced Instruction Set Computer) processor, for example. The PLC MAC block 1212 manages a MAC layer (Media Access Control layer) of transmission and reception signals, and the PLC PHY block 1213 manages a PHY layer (Physical layer) of transmission and reception signals. The AFE IC 1220 includes a D/A converter (DAC) 1221, an A/D converter (ADC) 1222, and a variable gain amplifier (VGA) 1223. The coupler 1270 includes a coil transformer 1271 and coupling capacitors 1272a and 1272b. The CPU 1211 controls the operation of the PLC MAC block 1212 and the PLC PHY block 1213 and also controls the whole PLC model 1100 using data stored in the memory 1240.

An outline of communications of the PLC model 1100 is as follows: Data input through the modular jack 1103 is sent to the main IC 1210 through the Ethernet (registered trademark) PHY IC 1230. The main IC 1210 performs digital signal processing of the data, thereby generating a digital transmission signal. The D/A converter (DAC) 1221 of the AFE IC 1220 converts the generated digital transmission signal into an analog signal and the analog signal is output to the power line 1350 through the low-pass filter 1251, the driver IC 1252, the coupler 1270, the power connector 1102, the power cable 1320, the power plug 1330, and the socket 1340.

The analog signal received from the power line 1350 is sent to the band-pass filter 1260 via the coupler 1270 and is subjected to gain control by the variable gain amplifier (VGA) 1223 of the AFE IC 1220 and then is converted into a digital signal by the A/D converter (ADC) 1222. The provided digital signal is sent to the main IC 1210, which then performs digital signal processing of the signal, whereby the signal is converted into digital data. The provided digital data is output from the modular jack 1103 through the Ethernet (registered trademark) PHY IC 1230.

The PLC modem 1100 conducts multicarrier communications using a plurality of subcarriers according to the OFDM system, and the main IC 1210 achieves digital signal processing concerning a communication signal. Digital signal processing of processing of converting transmission data into an OFDM transmission signal, processing of converting an OFDM reception signal into reception data, carrier detection processing of detecting the presence or absence of the transmitted OFDM signal, etc., is mainly performed in the PLC PHY block 1213.

The configuration of each of the embodiments described above is applied in the main IC 1210 of the PLC modem 1100, whereby the receiving apparatus can determine a postamble without the need for symbol synchronization and communication processing in each apparatus can be executed appropriately.

As described above, in the seventh embodiment, to transmit a packet containing communication data, a postamble indicating the end of the data part is provided and is a succession of the same data pieces and further a phase vector different from a preamble is given. Accordingly, information can be carried on the phase of a non-modulation signal and a postamble requiring no symbol synchronization can be realized. If reception signal synchronization is not achieved, the receiving apparatus can reliably determine the presence or absence of a postamble. Thus, the length of the data part in the packet is made variable and the postamble is provided following the data part, whereby the end of the packet can be identified. Therefore, it is made possible to transmit a packet of any desirable length on a network where a plurality of terminals exist. In this case, it is not necessary to transmit a synchronizing symbol to receive the postamble and if the apparatus on the network do not synchronize, the end of the packet can be identified, so that a packet collision can be decreased and a reduction in the transmission efficiency can be prevented.

It is to be understood that the invention also intends that those skilled in the art make various changes, modifications, and applications based on the Specification and widely known arts without departing from the spirit and scope of the invention, and the changes, the modifications, and the applications are also contained in the scope to be protected.

The electric circuits for realizing the functions shown in FIGS. 5, 6, 7, 18 to 21, and 24 to 27 may be implemented as a single integrated circuit.

The invention has the advantages that a postamble requiring no symbol synchronization can be realized and that if synchronization is not achieved, the presence or absence of the postamble can be determined reliably and it is made possible to transmit a packet of any desirable length on a network where a plurality of terminals exist; the invention is useful for a communication apparatus, etc., capable of conducting communications of a multicarrier communication system according to the OFDM system, etc., for example, such as a power line communication apparatus and a wireless communication apparatus.

Another aspect of the invention provides a communication apparatus for receiving reception data containing a preamble and a postamble, the communication apparatus including: a phase vector rerotating unit which rerotates a phase of at least one of a plurality of subcarriers relating to the preamble, and rerotates a phase of a plurality of at least one of subcarriers relating to the postamble, the first phase vector being different from the second phase vector.

Still another aspect of the invention provides a communication method for transmitting transmission data containing a preamble and a postamble, the communication method including: assigning a first phase vector to a plurality of subcarriers relating to the preamble; and assigning a second phase vector to a plurality of subcarriers relating to the postamble, the first phase vector being different from the second phase vector.

Still another aspect of the invention provides a communication method for receiving reception data containing a preamble and a postamble, the communication method including: rerotating a phase of at least one of a plurality of subcarriers relating to the preamble using a first phase vector; and rerotating a phase of at least one of a plurality of subcarriers relating to the postamble using a second phase vector, the first phase vector being different from the second phase vector.

Still another aspect of the invention provides an integrated circuit used in a communication apparatus for transmitting transmission data containing a preamble and a postamble, the integrated circuit including: a phase vector assigning unit which assigns a first phase vector to a plurality of subcarriers relating to the preamble, and assigns a second phase vector to a plurality of subcarriers relating to the postamble, the first phase vector being different from the second phase vector.

Still another aspect of the invention provides an integrated circuit used in a communication apparatus for receiving reception data containing a preamble and a postamble, the integrated circuit including: a phase vector rerotating unit which rerotates a phase of at least one of a plurality of subcarriers relating to the preamble using a first phase vector, and rerotates a phase of at least one of a plurality of subcarriers relating to the postamble using a second phase vector, the first phase vector being different from the second phase vector.

According to the configuration described above, the transmitting communication apparatus sets different specific phase vectors in the preamble and the postamble of the transmission data, respectively, and transmits the transmission data, and the receiving communication apparatus rerotates the phase vectors of the reception data and detects signals having the specific phase vectors corresponding to the preamble and the postamble. The transmitting communication apparatus can carry information on the phase of a non-modulation signal by assigning different phase vectors between the preamble and the postamble, and can realize a postamble requiring no symbol synchronization. The receiving communication apparatus sets a specific phase vector and performs carrier detection of the signal corresponding to the phase vector, whereby the apparatus can detect the preamble in the first phase vector corresponding to the preamble and can detect the postamble in the second phase vector corresponding to the postamble. At this time, information is carried on the phase of the non-modulation signal, whereby the receiving communication apparatus can reliably determine the presence or absence of the postamble if synchronization of the reception signal is not achieved. Thus, the length of the data part in the packet is made variable, and the postamble is provided following the data part, whereby the end of the packet can be identified. Therefore, it is made possible to transmit a packet of any desirable length on a network where a plurality of terminals exist. In this case, a packet collision and the use band loss of the channel can be suppressed. If a postamble is not yet transmitted at the data transmission time, data can be arbitrarily added into the same packet, so that addition of redundant data accompanying packet division can be reduced and the transmission efficiency can be enhanced.

According to the aspects of the invention, there can be provided a communication apparatus realizing a postamble requiring no symbol synchronization. There can also be provided a communication apparatus that can reliably determine the presence or absence of the postamble if synchronization is not achieved and makes it possible to transmit a packet of any desirable length on a network where a plurality of terminals exist.

As another aspect of the invention, the communication apparatus may further include: a multicarrier modulation unit which performs multicarrier modulation of the transmission data to generate a multicarrier signal; and a transmission unit which transmits the multicarrier signal, wherein the phase vector assigning unit rotates a phase of at least one of subcarriers relating to the preamble using a first bit set to assign the first phase vector, and rotates a phase of at least one of subcarriers relating to the postamble using a second bit set to assign the second phase vector, the first bit set being different from the second bit set.

As another aspect of the invention, in the communication apparatus, the transmission data may include at least two or more same consecutive data pieces as each of the preamble and the postamble.

As another aspect of the invention, in the communication apparatus, the phase vector assigning unit may switch a phase vector for rotating the phase between the first phase vector relating to the preamble and the second phase vector relating to the postamble in response to a sending timing of the preamble or the postamble in the transmission data.

As another aspect of the invention, in the communication apparatus, the phase vector assigning unit may form the first phase vector relating to the preamble and the second phase vector relating to the postamble based on a bit series of cyclic shift type.

As another aspect of the invention, in the communication apparatus, the multicarrier modulation unit may have an inverse FFT converter which performs the multicarrier modulation using inverse Fourier transform.

As another aspect of the invention, in the communication apparatus, the multicarrier modulation unit may have an inverse wavelet converter which performs the multicarrier modulation using inverse wavelet transform.

As another aspect of the invention, the communication apparatus may further include: a reception unit which receives a multicarrier signal for carrying the reception data; a multicarrier demodulation unit which performs multicarrier demodulation of the reception data; and a carrier detection unit which performs carrier detection for the multicarrier signal provided by the phase vector rerotating unit and detects the preamble or the postamble of the reception data.

As another aspect of the invention, in the communication apparatus, the phase vector rerotating unit may switch phase vector of a phase rotator for rotating the phase between the first phase vector relating to the preamble and the second phase vector relating to the postamble in response to the detection result of the preamble or the postamble in the reception data, and the carrier detection unit detects the preamble using the first phase vector and detects the postamble using the second phase vector in time series.

As another aspect of the invention, in the communication apparatus, the phase vector rerotating unit may have a first phase rotator for rotating the phase based on the first phase vector relating to the preamble and a second phase rotator for rotating the phase based on the second phase vector relating to the postamble, and the carrier detection unit detects the preamble using the first phase vector and detects the postamble using the second phase vector in parallel.

As another aspect of the invention, in the communication apparatus, multicarrier demodulation unit may include an FFT converter which performs the multicarrier demodulation using Fourier transform.

As another aspect of the invention, in the communication apparatus, the multicarrier demodulation unit may include a wavelet converter which performs the multicarrier demodulation using wavelet transform.

As another aspect of the invention, in the communication apparatus, a channel for conducting data communications may be a power line.

As another aspect of the invention, in the communication apparatus, a channel for conducting data communications may be a radio link.

What is claimed is:

1. A communication apparatus for transmitting a transmission frame containing a preamble and a postamble, the communication apparatus comprising:
a phase vector assigning unit which assigns a first phase vector to a plurality of subcarriers relating to the preamble and assigns a second phase vector to a plurality of subcarriers relating to the postamble, the first phase vector being different from the second phase vector.

2. The communication apparatus as claimed in claim 1, further comprising:
a multicarrier modulation unit which performs multicarrier modulation of the transmission data to generate a multicarrier signal; and
a transmission unit which transmits the multicarrier signal, wherein the phase vector assigning unit rotates a phase of at least one of subcarriers relating to the preamble using a first bit set to assign the first phase vector, and rotates a phase of at least one of subcarriers relating to the postamble using a second bit set to assign the second phase vector, the first bit set being different from the second bit set.

3. The communication apparatus as claimed in claim 1, wherein the transmission data includes at least two or more same consecutive data pieces as each of the preamble and the postamble.

4. The communication apparatus as claimed in claim 2, wherein the phase vector assigning unit switches a phase vector for rotating the phase between the first phase vector relating to the preamble and the second phase vector relating to the postamble in response to a sending timing of the preamble or the postamble in the transmission data.

5. The communication apparatus as claimed in claim 1, wherein the phase vector assigning unit forms the first phase vector relating to the preamble and the second phase vector relating to the postamble based on a bit series of cyclic shift type.

6. The communication apparatus as claimed in claim 2, wherein the multicarrier modulation unit has an inverse PFT converter which performs the multicarrier modulation using inverse Fourier transform.

7. The communication apparatus as claimed in claim 2, wherein the multicarrier modulation unit has an inverse wavelet converter which performs the multicarrier modulation using inverse wavelet transform.

8. The communication apparatus as claimed in claim 1, wherein a channel for conducting data communications is a power line.

9. The communication apparatus as claimed in claim 1, wherein a channel for conducting data communications is a radio link.

10. A communication apparatus for receiving a reception frame containing a preamble and a postamble, the communication apparatus comprising:
a phase vector rerotating unit which rerotates a phase of at least one of a plurality of subcarriers relating to the preamble, and rerotates a phase of a plurality of at least one of subcarriers relating to the postamble, the first phase vector being different from the second phase vector.

11. The communication apparatus as claimed in claim 10, further comprising:
a reception unit which receives a multicarrier signal for carrying the reception data;
a multicarrier demodulation unit which performs multicarrier demodulation of the reception data; and
a carrier detection unit which performs carrier detection for the multicarrier signal provided by the phase vector rerotating unit and detects the preamble or the postamble of the reception data.

12. The communication apparatus as claimed in claim 10, wherein the phase vector rerotating unit switches phase vector of a phase rotator for rotating the phase between the first phase vector relating to the preamble and the second phase vector relating to the postamble in response to the detection result of the preamble or the postamble in the reception data, and
wherein the carrier detection unit detects the preamble using the first phase vector and detects the postamble using the second phase vector in time series.

13. The communication apparatus as claimed in claim 10, wherein the phase vector rerotating unit has a first phase rotator for rotating the phase based on the first phase vector relating to the preamble and a second phase rotator for rotating the phase based on the second phase vector relating to the postamble, and
wherein the carrier detection unit detects the preamble using the first phase vector and detects the postamble using the second phase vector in parallel.

14. The communication apparatus as claimed in claim 11, wherein the multicarrier demodulation unit includes an FFT converter which performs the multicarrier demodulation using Fourier transform.

15. The communication apparatus as claimed in claim 11, wherein the multicarrier demodulation unit includes a wavelet converter which performs the multicarrier demodulation using wavelet transform.

16. A communication method for transmitting a transmission frame containing a preamble and a postamble, the communication method comprising:
assigning a first phase vector to a plurality of subcarriers relating to the preamble; and
assigning a second phase vector to a plurality of subcarriers relating to the postamble, the first phase vector being different from the second phase vector.

17. A communication method for receiving a reception frame containing a preamble and a postamble, the communication method comprising:
rerotating a phase of at least one of a plurality of subcarriers relating to the preamble using a first phase vector; and
rerotating a phase of at least one of a plurality of subcarriers relating to the postamble using a second phase vector, the first phase vector being different from the second phase vector.

18. An integrated circuit used in a communication apparatus for transmitting a transmission frame containing a preamble and a postamble, the integrated circuit comprising:
a phase vector assigning unit which assigns a first phase vector to a plurality of subcarriers relating to the preamble, and assigns a second phase vector to a plurality of subcarriers relating to the postamble, the first phase vector being different from the second phase vector.

19. An integrated circuit used in a communication apparatus for receiving a reception frame containing a preamble and a postamble, the integrated circuit comprising:

a phase vector rerotating unit which rerotates a phase of at least one of a plurality of subcarriers relating to the preamble using a first phase vector, and rerotates a phase of at least one of a plurality of subcarriers relating to the postamble using a second phase vector, the first phase vector being different from the second phase vector.

* * * * *